(12) United States Patent
Cho et al.

(10) Patent No.: US 12,507,109 B2
(45) Date of Patent: Dec. 23, 2025

(54) CELL ACTIVATION PROCEDURES

(71) Applicant: QUALCOMM Incorporated, San Diego, CA (US)

(72) Inventors: Hyunwoo Cho, San Diego, CA (US); Changhwan Park, San Diego, CA (US); Jae Ho Ryu, San Diego, CA (US); Heechoon Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 18/356,798

(22) Filed: Jul. 21, 2023

(65) Prior Publication Data

US 2024/0114373 A1    Apr. 4, 2024

Related U.S. Application Data

(60) Provisional application No. 63/411,474, filed on Sep. 29, 2022.

(51) Int. Cl.
*H04B 17/24* (2015.01)
*H04B 17/318* (2015.01)
(Continued)

(52) U.S. Cl.
CPC ............ *H04W 24/10* (2013.01); *H04B 17/24* (2015.01); *H04B 17/328* (2023.05);
(Continued)

(58) Field of Classification Search
CPC ..... H04B 17/0082–3913; H04L 5/0001–0098; H04W 8/22–245;
(Continued)

(56) References Cited

U.S. PATENT DOCUMENTS

2022/0086676 A1 * 3/2022 Ai .......................... H04W 24/10

FOREIGN PATENT DOCUMENTS

| EP | 3866379 A1 * | 8/2021 | ............ H04W 24/10 |
| EP | 3968729 A1 | 3/2022 | |
| WO | WO-2014050529 A1 * | 4/2014 | ............ H04W 24/10 |

OTHER PUBLICATIONS

3GPP TS 38.133: "3rd Generation Partnership Project, Technical Specification Group Radio Access Network, NR, Requirements for Support of Radio Resource Management (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG4, No. V16.13.0, Sep. 27, 2022, 481 Pages, XP052211302, Abstract Paragraph [08.3].

(Continued)

*Primary Examiner* — Timothy J Weidner
(74) *Attorney, Agent, or Firm* — Loza & Loza LLP

(57) ABSTRACT

Aspects relate to activation of a cell (e.g., an SCell) based on measurements made by a user equipment (UE) when the cell is not activated with respect to (e.g., as a secondary cell for) the UE (e.g., the cell is deemed by the network as an unknown cell for that UE). In this case, when the network requests the UE to conduct measurements with respect to that cell (e.g., in conjunction with activation of the cell), the UE may report information based on the measurements the UE conducted when the cell was not activated with respect to that UE.

30 Claims, 17 Drawing Sheets

(51) Int. Cl.
*H04W 24/08* (2009.01)
*H04W 24/10* (2009.01)
*H04W 36/00* (2009.01)
*H04W 56/00* (2009.01)
*H04W 72/231* (2023.01)
*H04W 72/232* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ....... *H04W 24/08* (2013.01); *H04W 36/0058* (2018.08); *H04W 36/0088* (2013.01); *H04W 56/001* (2013.01); *H04W 56/0015* (2013.01); *H04W 72/231* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .......... H04W 24/02–10; H04W 36/0005–385; H04W 48/02–20; H04W 56/001–0025; H04W 72/02–569; H04W 84/02–16; H04W 88/02–12; H04W 92/02–04; H04W 92/10
See application file for complete search history.

(56) References Cited

OTHER PUBLICATIONS

International Search Report and Written Opinion—PCT/US2023/071545—ISA/EPO—Dec. 4, 2023.
Qualcomm Incorporated: "Discussion on RRM Requirements for FR2 Unknown Scell Activation Delay Reduction", 3GPP TSG-RAN WG4 Meeting# 104bis-e, R4-2216744, 3rd Generation Partnership Project (3GPP), Mobile Competence Centre, 650, Route Des Lucioles, F-06921 Sophia-Antipolis Cedex, France, vol. RAN WG4, No. Electronic Meeting, Oct. 10, 2022-Oct. 19, 2022, Sep. 30, 2022, 4 Pages, XP052268120, The Whole Document.

* cited by examiner

CELL ACTIVATION PROCEDURES

CROSS-REFERENCE TO RELATED APPLICATIONS

The present application for patent claims priority to and the benefit of U.S. Provisional Application No. 63/411,474, titled "CELL ACTIVATION PROCEDURES" filed Sep. 29, 2022, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to cell activation procedures.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station. A base station may schedule access to a cell to support access by multiple UEs. For example, a base station may allocate different resources (e.g., time domain and frequency domain resources) to be used by different UEs operating within the cell.

Different cells may serve a UE at different times. For example, a UE may initially be served by a first cell. Subsequently, an additional cell may be selected to serve the UE (e.g., to provide additional resources for serving the UE). Alternatively, or in addition, a cell that is serving the UE may be changed (switched out) whereby a different cell will serve the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment may include a transceiver, and at least one processor coupled to the transceiver. The at least one processor may be individually or collectively configured to receive a measurement report configuration. The at least one processor may also be individually or collectively configured to measure signals received from a first cell when the first cell is not activated as a secondary cell (SCell) for the user equipment. The at least one processor may further be individually or collectively configured to receive a first message that indicates that the user equipment is to report measurements of the first cell based on the measurement report configuration. The at least one processor may additionally be individually or collectively configured to transmit a first measurement report responsive to the first message. In some examples, the first measurement report is based on the measurement of the signals received from the first cell when the first cell was not activated as the SCell for the user equipment.

In some examples, a method for wireless communication at a user equipment is disclosed. The method may include receiving a measurement report configuration. The method may also include measuring signals received from a first cell when the first cell is not activated as a secondary cell (SCell) for the user equipment. The method may further include receiving a first message that indicates that the user equipment is to report measurements of the first cell based on the measurement report configuration. The method may additionally include transmitting a first measurement report responsive to the first message. In some examples, the first measurement report is based on the measuring the signals received from the first cell when the first cell was not activated as the SCell for the user equipment.

In some examples, a user equipment may include means for receiving a measurement report configuration. The user equipment may also include means for measuring signals received from a first cell when the first cell is not activated as a secondary cell (SCell) for the user equipment. The user equipment may further include means for receiving a first message that indicates that the user equipment is to report measurements of the first cell based on the measurement report configuration. The user equipment may additionally include means for transmitting a first measurement report responsive to the first message. In some examples, the first measurement report is based on the measuring the signals received from the first cell when the first cell was not activated as the SCell for the user equipment.

In some examples, a non-transitory computer-readable medium has stored therein instructions executable by one or more processors of a user equipment to receive a measurement report configuration. The computer-readable medium may also have stored therein instructions executable by one or more processors of the user equipment to measure signals received from a first cell when the first cell is not activated as a secondary cell (SCell) for the user equipment. The computer-readable medium may further have stored therein instructions executable by one or more processors of the user equipment to receive a first message that indicates that the user equipment is to report measurements of the first cell based on the measurement report configuration. The computer-readable medium may additionally have stored therein instructions executable by one or more processors of the user equipment to transmit a first measurement report responsive to the first message. In some examples, the first measurement report is based on the measurement of the signals received from the first cell when the first cell was not activated as the SCell for the user equipment.

In some examples, a network entity may include a transceiver, and at least one processor coupled to the transceiver. The at least one processor may be individually or collectively configured to transmit a measurement report configuration to a user equipment. The at least one processor may also be individually or collectively configured to transmit a first message that indicates that the user equipment is to report measurements of a first cell based on the measurement report configuration. In some examples, the first cell is not activated as a secondary cell (SCell) for the user equipment prior to the transmission of the first message. The at least one processor may further be individually or collectively configured to receive a first measurement report responsive to the first message. In some examples, the first measurement report is based on measurements by the user equipment of signals received from the first cell when the first cell was not activated as the SCell for the user equipment.

In some examples, a method for wireless communication at a network entity is disclosed. The method may include transmitting a measurement report configuration to a user equipment. The method may also include transmitting a first message that indicates that the user equipment is to report measurements of a first cell based on the measurement report configuration. In some examples, the first cell is not activated as a secondary cell (SCell) for the user equipment prior to the transmitting the first message. The method may further include receiving a first measurement report responsive to the first message. In some examples, the first measurement report is based on measurements by the user equipment of signals received from the first cell when the first cell was not activated as the SCell for the user equipment.

In some examples, a network entity may include means for transmitting a measurement report configuration to a user equipment. The network entity may also include means for transmitting a first message that indicates that the user equipment is to report measurements of a first cell based on the measurement report configuration. In some examples, the first cell is not activated as a secondary cell (SCell) for the user equipment prior to the transmitting the first message. The network entity may further include means for receiving a first measurement report responsive to the first message. In some examples, the first measurement report is based on measurements by the user equipment of signals received from the first cell when the first cell was not activated as the SCell for the user equipment.

In some examples, a non-transitory computer-readable medium has stored therein instructions executable by one or more processors of a network entity to transmit a measurement report configuration to a user equipment. The computer-readable medium may also have stored therein instructions executable by one or more processors of the network entity to transmit a first message that indicates that the user equipment is to report measurements of a first cell based on the measurement report configuration. In some examples, the first cell is not activated as a secondary cell (SCell) for the user equipment prior to the transmission of the first message. The computer-readable medium may further have stored therein instructions executable by one or more processors of the network entity to receive a first measurement report responsive to the first message. In some examples, the first measurement report is based on measurements by the user equipment of signals received from the first cell when the first cell was not activated as the SCell for the user equipment.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
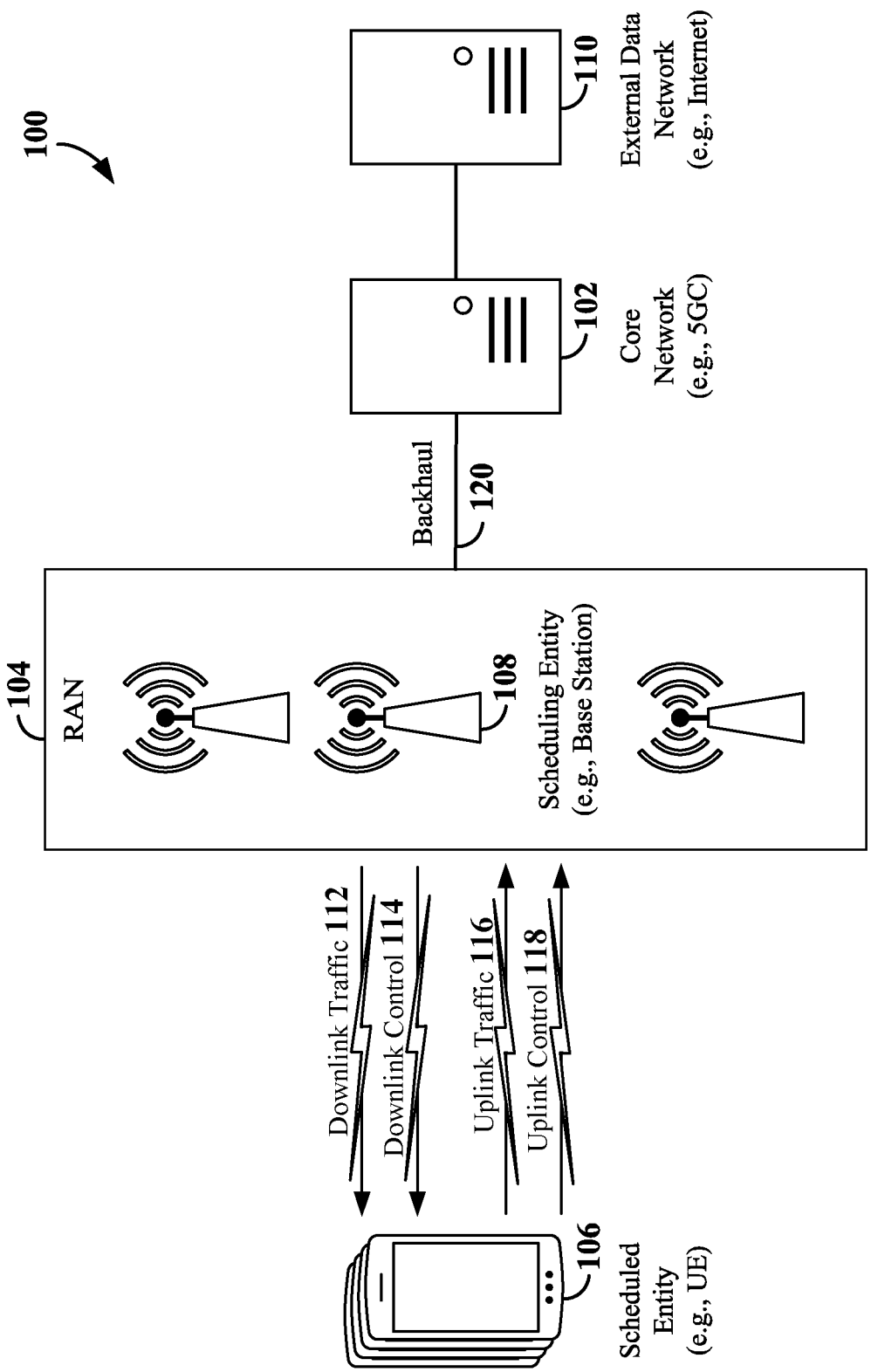
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to cell activation procedures. For a UE that is connected to a primary cell (PCell), the network may activate a secondary cell (SCell) for the UE under certain circumstances. For example, the network may activate an SCell for the UE to provide additional throughput, bandwidth, etc., for the UE. Subsequently, the network may deactivate the SCell for the UE when the UE no longer needs the additional connectivity provided by the SCell.

The disclosure relates in some aspects to activation of a cell (e.g., an SCell) based on measurements made by a UE when the cell is not activated with respect to (e.g., as a secondary cell for) the UE (e.g., the cell is deemed by the network as an unknown cell for that UE). In this case, when the network requests the UE to conduct measurements with respect to that cell (e.g., in conjunction with activation of the cell), the UE may report information based on the measurements the UE conducted when the cell was not activated with respect to that UE. In some aspects, this procedure may result in a shorter cell activation time.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network. The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
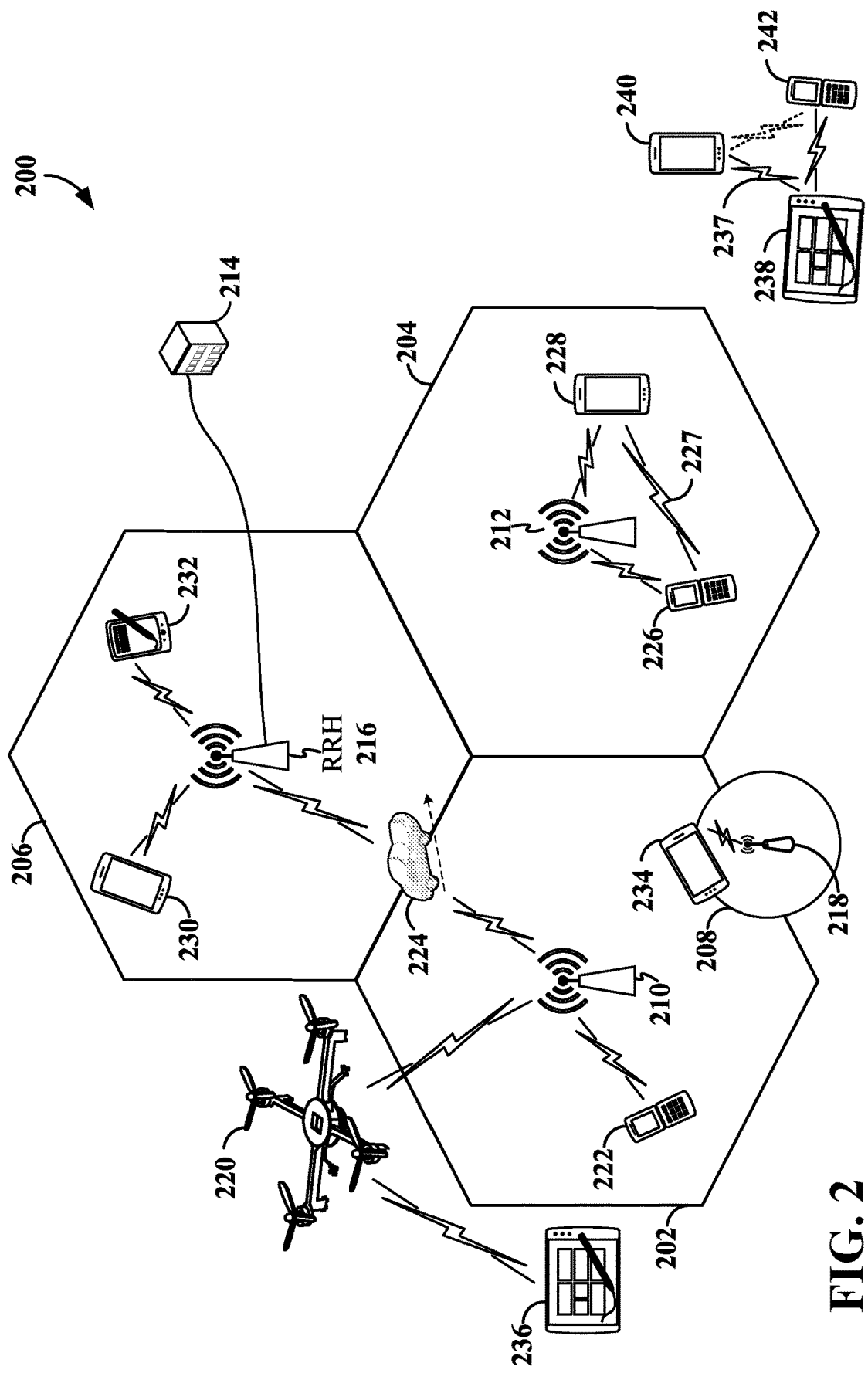
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSS s) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
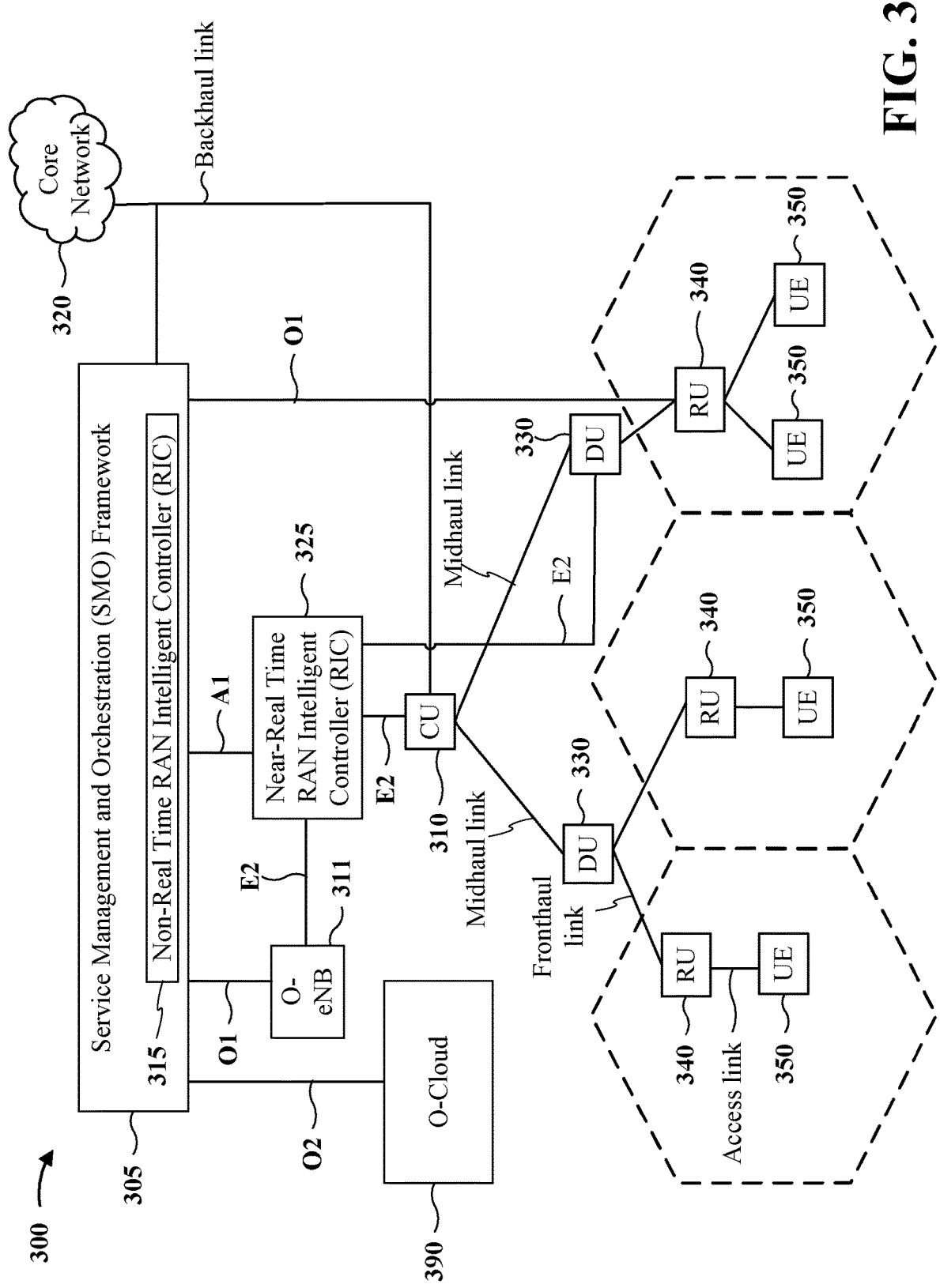
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
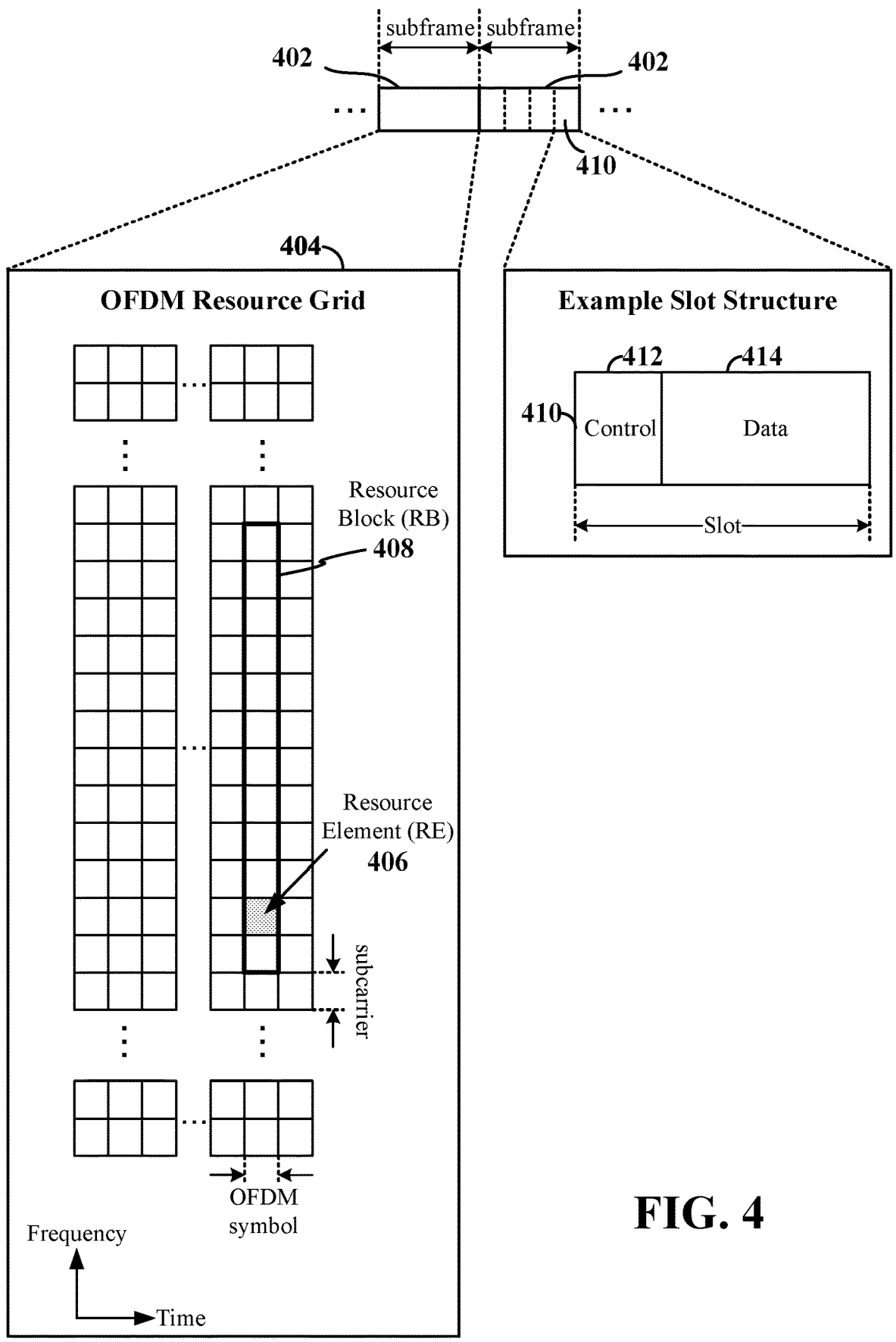
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIB s and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5A:
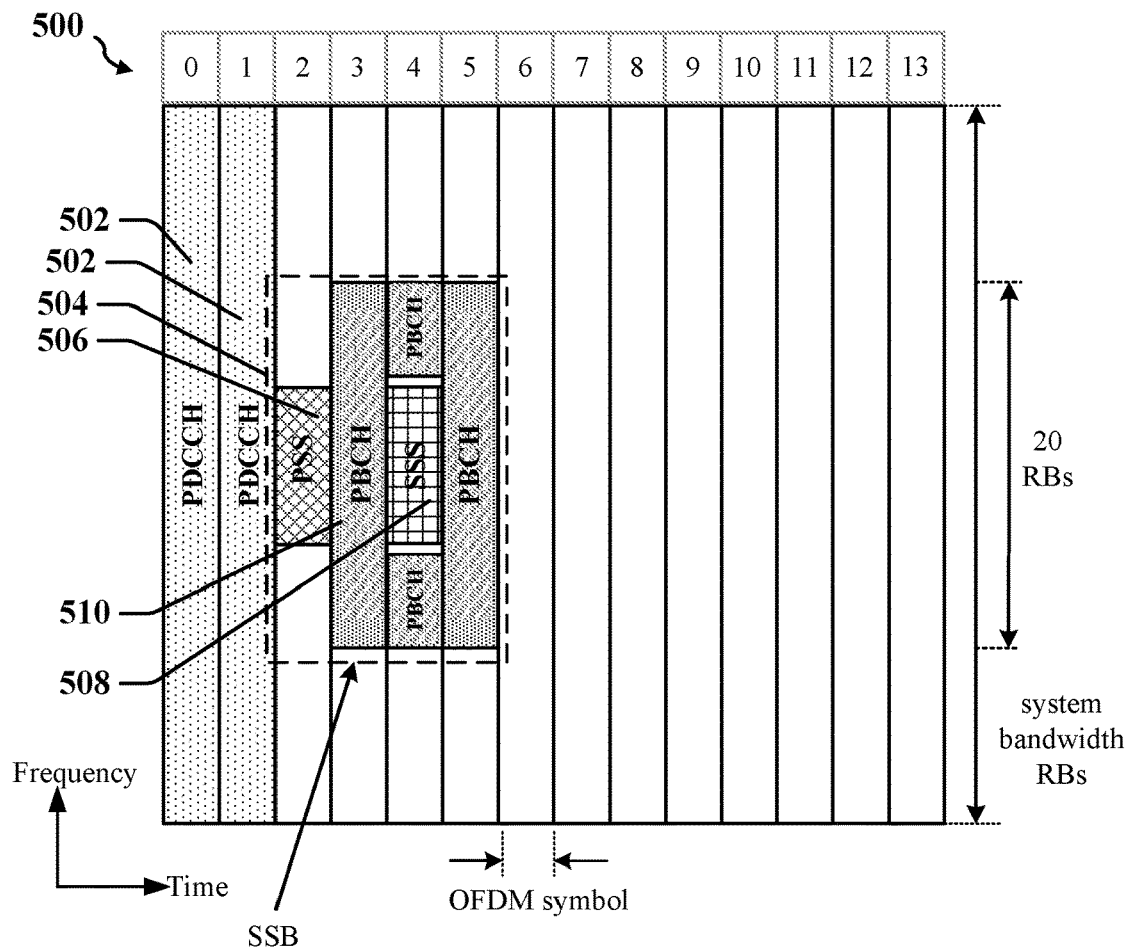
FIG. 5A is a diagram illustrating an example of a frame structure of synchronization signals for use in a wireless communication network according to some aspects.

FIG. 5A illustrates an example 500 of various downlink channels within a subframe of a frame including channels used for initial access and synchronization. As shown in FIG. 5A, a physical downlink control channel (PDCCH) 502 is transmitted in at least two symbols (e.g., symbol 0 and symbol 1) and may carry DCI within at least one control channel element (CCE), with each CCE including nine RE groups (REGs), and each RE group (REG) including four consecutive REs in an OFDM symbol. Additionally, FIG. 5A illustrates an exemplary synchronization signal block (SSB) 504 that may be periodically transmitted by a base station or gNB. The SSB 504 carries synchronization signals PSS 506 and SSS 508 and broadcast channels (PBCH) 510.

In this example, the SSB 504 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., the SSB 504. The MIB provides a number of RBs in the system bandwidth and a system frame number (SFN).

Figure 5B:
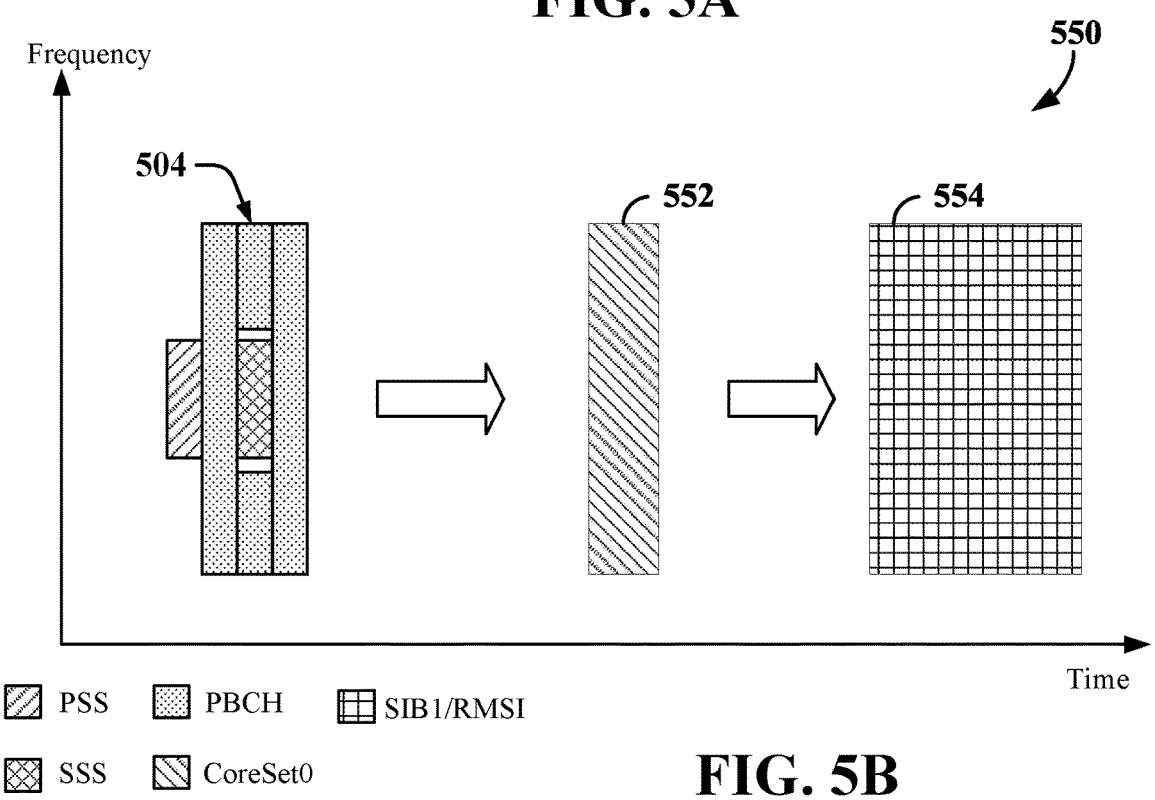
FIG. 5B is a diagram illustrating an example of a portion of a frame or subframe structure with various channels and associated messages for use in a wireless communication network according to some aspects.

FIG. 5B is a diagram illustrating various broadcast information 550 related to initial cell access according to some examples. The broadcast information 550 may be transmitted by a RAN node (e.g., a base station, such as an eNB or gNB) on resources (e.g., time-frequency resources) allocated for the transmission of the broadcast information 550 in a cell. The broadcast information 550 includes the SSB 504 illustrated in FIG. 5A. It is noted that the PBCH in the SSB 504 includes the MIB carrying various system information (SI) including, for example, a cell barred indication, the subcarrier spacing, the system frame number, and scheduling information for a CORESET0 552. For example, the PBCH in the SSB 504 may include scheduling information indicating time-frequency resources allocated for the CORESET0 552. In some examples, the CORESET0 552 may be transmitted within the first four symbols (e.g., within a control region) of a slot. In addition, the CORESET0 552 carries a PDCCH with DCI that contains scheduling information for scheduling the SIB1 554. The SIB1 554 is carried within a physical downlink shared channel (PDSCH) within a data region of a slot. In addition, the SIB1 554 may be referred to as RMSI and includes, for example, a set of radio resource parameters providing network identification and configuration. For example, the set of radio resource parameters may include a bandwidth (e.g., number of BWPs) on which a UE may communicate with a base station.

The MIB in the PBCH may include system information (SI), along with parameters for decoding a SIB (e.g., SIB1). Examples of SI transmitted in the MIB may include, but are not limited to, a subcarrier spacing, a system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a base station (BS) may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN (e.g., the RAN 200 of FIG. 2) may perform an initial cell search by detecting a PSS from a BS (e.g., the PSS of a cell of the BS) of the RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIB s discussed above. The system information may include information that a UE can use to access the network such as downlink (DL) channel configuration information, uplink (UL) channel configuration information, access class information, and cell barring information, as well as other information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN. In some examples, the SIB2 includes random access configuration information (e.g., a random access channel (RACH) configuration) that indicates the resources that the UE is to use to communicate with the RAN during initial access. The random access configuration information may indicate, for example, the resources allocated by the RAN for a RACH procedure. For example, the RACH configuration may indicate the resources allocated by the network for the UE to transmit a physical random access channel (PRACH) preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Figure 6:
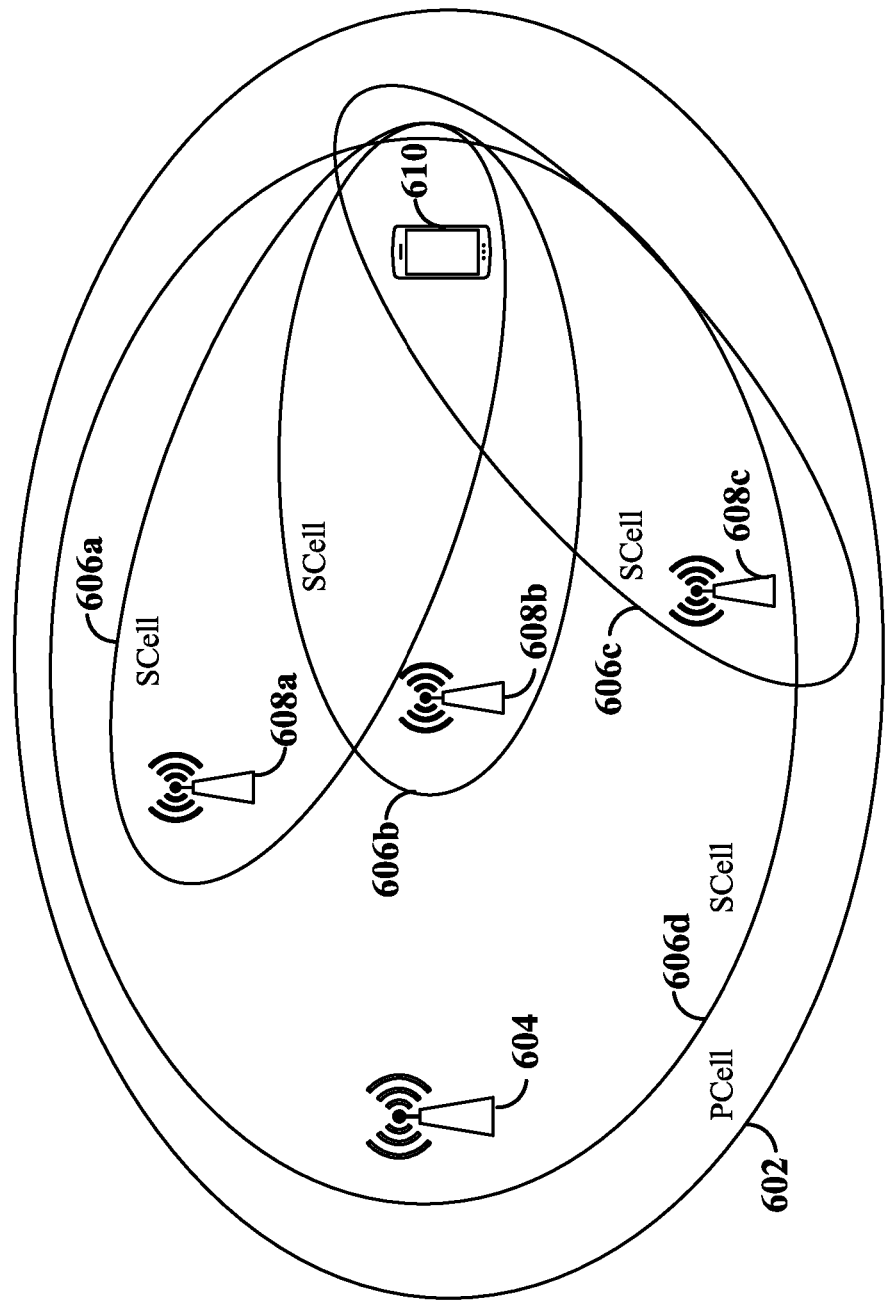
FIG. 6 is a conceptual illustration of wireless communication via multiple cells according to some aspects.

FIG. 6 is a conceptual illustration of a wireless communication system that shows a base station (BS) and a user equipment (UE) communicating via multiple carriers according to some aspects of the disclosure. In particular, FIG. 6 shows an example of a wireless communication system 600 that includes a primary serving cell (PCell) 602 and one or more secondary serving cells (SCells) 606*a*, 606*b*, 606*c*, and 606*d*. The PCell 602 may be referred to as the anchor cell that provides a radio resource control (RRC) connection to the UE 610. In some examples, the PCell and the SCell may be co-located (e.g., different TRPs at the same location). The UE 610 may correspond to any of the UEs or scheduled entities shown in any of FIGS. 1, 2, 3, and 14.

One or more of the SCells 606*a*-606*d* may be activated or added to the PCell 602 to form the serving cells serving the UE 610. Each serving cell corresponds to a component carrier (CC). The CC of the PCell 602 may be referred to as a primary CC, and the CC of a SCell 606*a*-606*d* may be referred to as a secondary CC. The PCell 602 and one or more of the SCells 606 may be served by a respective base station 604 and 608a-608c or scheduling entity similar to those illustrated in any of FIGS. 1, 2, 4, and 16. In the example shown in FIG. 6, SCells 606a-606c are each served by a respective base station 608a-608c. SCell 606d is co-located with the PCell 602. For example, the base station 604 may include multiple TRPs, each supporting a different carrier. The coverages of the PCell 602 and SCell 606d may differ since component carriers in different frequency bands may experience different path loss.

In some examples, the PCell 602 may add or remove one or more of the SCells 606a-606d to improve reliability of the connection to the UE 610 and/or increase the data rate. For example, an SCell may be activated for a given UE if the cell/cells currently serving the UE does/do not provide a desired level of service (e.g., the new SCell provides more throughput, higher reliability, etc.). On the other hand, once the UE no longer needs the higher level of service provided by an SCell (e.g., if the PCell can adequately service the current traffic requirement for the UE), the network may temporarily deactivate the SCell (e.g., disable data transmissions to and from that SCell) with respect to that UE. In some examples, an SCell that is deactivated with respect to a particular UE may be referred to as being deemed by the network as an unknown cell for that UE. Also, the PCell 602 may be changed upon a handover to another PCell.

In some examples, the PCell 602 may utilize a first radio access technology (RAT), such as LTE, while one or more of the SCells 606 may utilize a second RAT, such as 5G or 6G-NR. In this example, the multi-cell transmission environment may be referred to as a multi-RAT-dual connectivity (MR-DC) environment. One example of MR-DC is Evolved-Universal Terrestrial Radio Access Network (E-UTRAN)-New Radio (NR) dual connectivity (EN-DC) mode that enables a UE to simultaneously connect to an LTE base station and a NR base station to receive data packets from and send data packets to both the LTE base station and the NR base station.

In some examples, the PCell 602 may be a low band cell, and the SCells 606 may be high band cells. A low band (LB) cell uses a CC in a frequency band lower than that of the high band cells. For example, the high band cells may use a millimeter wave (mmW) CC, and the low band cell may use a CC in a band (e.g., sub-6 GHz band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

Figure 7:
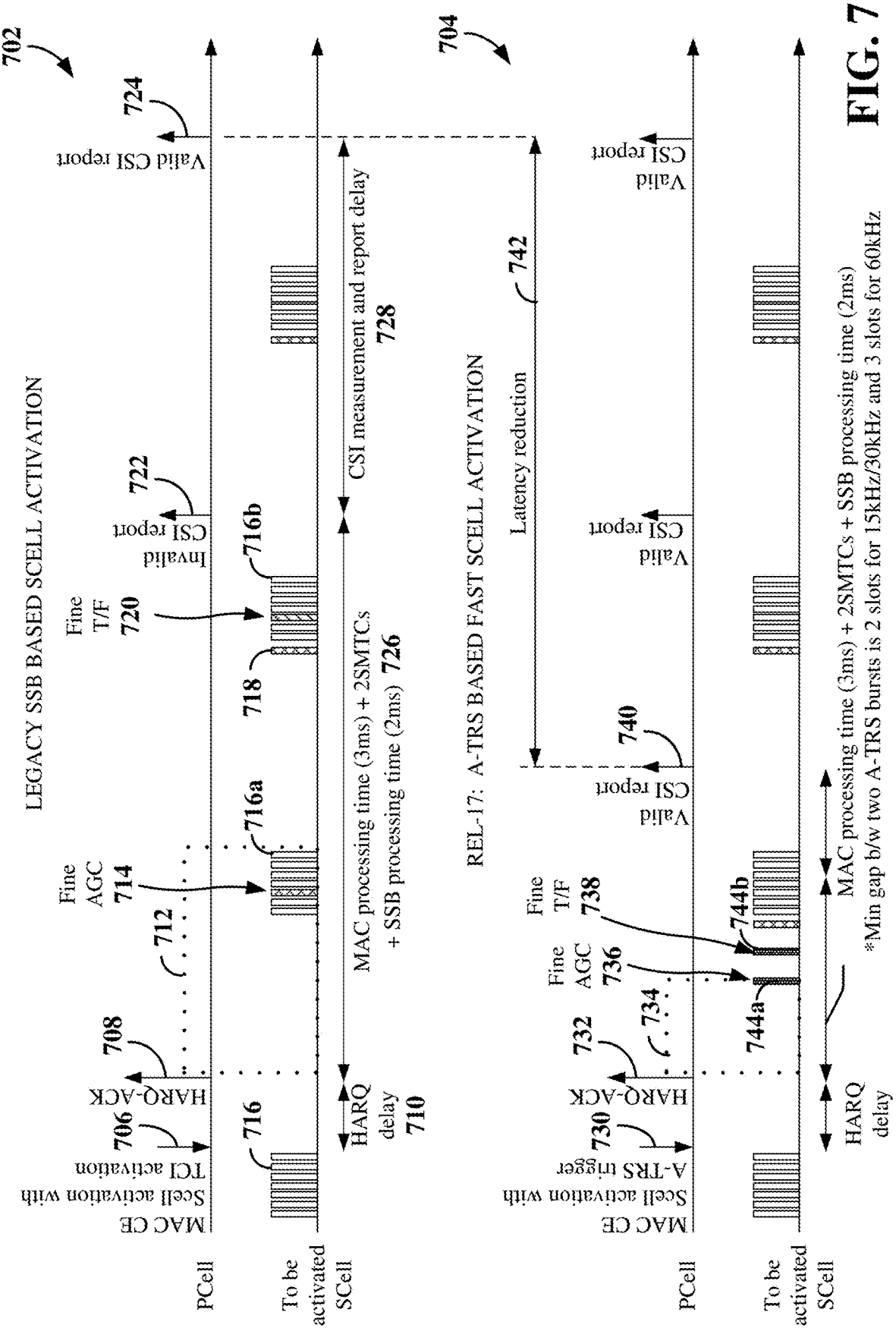
FIG. 7 is a diagram illustrating examples of signaling associated with cell activation according to some aspects.

The disclosure relates in some aspects to techniques for TRS based fast SCell activation. FIG. 7 is a diagram illustrating different examples of signaling associated with cell activation according to some aspects. A first diagram 702 illustrates signaling that may be used in a first scenario (e.g., for legacy SSB based SCell activation). A second diagram 704 illustrates signaling that may be used in a second scenario (e.g., for aperiodic TRS (A-TRS) based SCell activation). In each scenario, a UE is connected to a PCell and the network is activating an SCell for the UE.

In the first diagram 702, a network entity (e.g., a gNB, not shown) sends a MAC-CE 706 via a PCell to a UE (e.g., as indicated by the corresponding downward arrow). The MAC-CE 706 includes a transmission configuration indication (TCI) activation command that indicates that a particular SCell is to be activated. In response to the MAC-CE 706, the UE sends a HARQ-Ack 708 to the network entity (e.g., as indicated by the corresponding upward arrow). The associated HARQ-Ack delay 710 is indicated by the corresponding double-arrowed line in FIG. 7. A starting point of an interruption window 712 associated with the SCell activation is represented by a dashed box in FIG. 7. The UE conducts fine automatic gain control (AGC) measurements 714 on the periodic SSB signals 716 (on an SSB occasion 716a in this example) transmitted by the SCell (e.g., the SSB ID of the SSB signals 716 is associated with the activated TCI). CSI-RS resources for acquisition 718 are also indicated. The UE subsequently conducts fine timing and frequency (T/F) measurements 720 on the periodic SSB signals 716 (on an SSB occasion 716b in this example) transmitted by the SCell. Once the UE acquires the T/F information, the UE can determine the SSB ID of the SCell. Due to processing time constraints (e.g., MAC processing time, SSB measurement timing configurations (SMTCs), and SSB processing time 726 and CSI measurement and reporting delay 728, indicated by respective double-arrowed lines in FIG. 7), the UE is not able to send a valid CSI report at the time 722. However, the UE is able to send a valid CSI report at the time 724. In some examples, the MAC processing time, SMTCs, and SSB processing time 726 may correspond to a MAC processing time of 3 milliseconds (ms), 2 SMTCs, and an SSB processing time of 2 ms as indicated in FIG. 7.

In the second diagram 704, a network entity (e.g., a gNB, not shown) sends a MAC-CE 730 via a PCell to a UE. The MAC-CE 730 includes a TCI activation command that indicates an A-TRS trigger. In response to the MAC-CE 730, the UE sends a HARQ-Ack 732 to the network entity. A starting point of an interruption window 734 associated with the SCell activation is represented by a dashed box in FIG. 7. The UE conducts fine automatic gain control (AGC) measurements 736 on an aperiodic temporary TRS burst 744a transmitted by the SCell (e.g., as indicated by the TCI activation command). The UE then conducts fine timing and frequency (T/F) measurements 738 on another aperiodic temporary TRS burst 744b transmitted by the SCell (e.g., as indicated by the activation command). In some examples, the temporary TRS burst 744a and the temporary TRS burst 744b may be 5 milliseconds apart. Thus, in contrast with the scenario of the first diagram 702, the UE does need to wait for SSB bursts (e.g., which may be 40 milliseconds apart) for the AGC and fine T/F operations. Since the processing time constraints are much shorter in this scenario, the UE is able to send a valid CSI report at the time 740. As shown in FIG. 7, a latency reduction 742 may thereby be achieved, as compared to the legacy activation (e.g., the example of the first diagram 702). In the example of the second diagram 704, the network will know which SSB is associated with the temporary TRS since the temporary TRS will be used instead of the SSB for the AGC and fine T/F operations (e.g., the TRS is associated with a quasi-co-located SSB).

Figure 8:
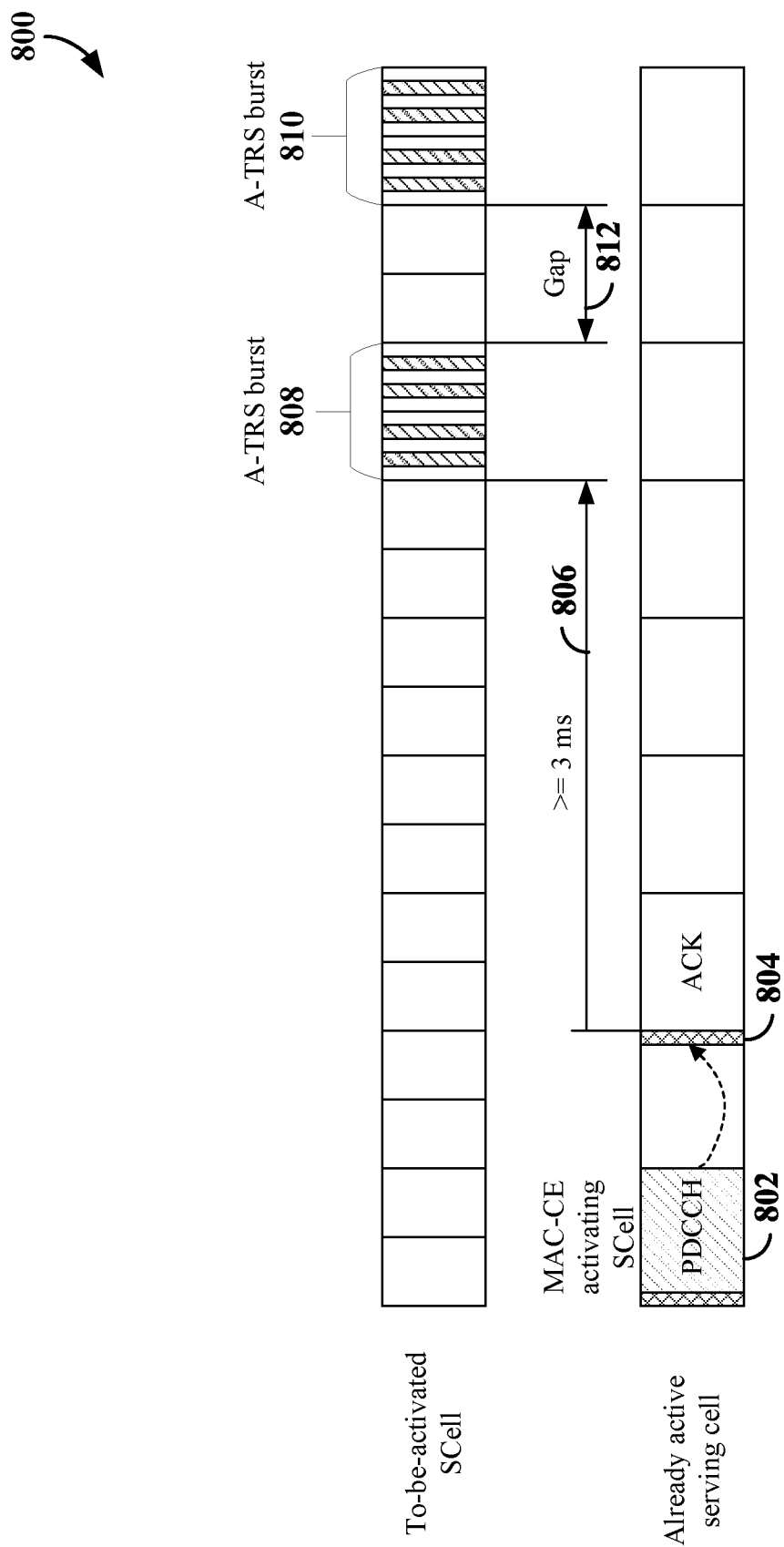
FIG. 8 is a diagram illustrating an example of signaling associated with aperiodic tracking reference signal bursts according to some aspects.

FIG. 8 is a diagram 800 illustrating an example of signaling associated with an A-TRS and a physical layer structure of the A-TRS for fast SCell activation according to some aspects. The network entity transmits, via a currently active serving cell, a PDCCH 802 including a MAC-CE that activates an SCell to a UE. In response, the UE transmits an ACK (e.g., HARQ-Ack) 804. The A-TRS bursts from the SCell may then commence a defined period of time 806 (e.g., at least 3 ms in some examples) after the ACK 804. In this example, the SCell transmits a first A-TRS burst 808 and a second A-TRS burst 810 separated by a gap 812. In some examples, one TRS burst=4 CSI-RS resources in 2 consecutive slots (e.g., as in a legacy TRS).

An A-TRS for fast SCell activation may include 1 TRS burst or 2 TRS bursts in some implementations. In some examples, the number of TRS burst(s) is identified by a gap between bursts provided in a parameter ScellActivationRS-Config (e.g., provided by RRC signaling). For the case of two TRS bursts, in some examples, the minimum gap is 2 slots for 15 kHz or 30 kHz and 3 slots for 60 kHz and the second TRS burst has the same AP and T/F resources as the first TRS burst. The starting slot of the A-TRS burst(s) may be based on the offset from the ACK transmission. In some examples, this offset is provided in an ScellActivationRS-Config parameter and indicated by the MAC-CE (e.g., the MAC-CE indicates which ScellActivationRS-Config parameter applies for a given SCell). In some examples, the starting slot is the earliest slot that UE applies actions related to SCell activations as specified by 3GPP TS 38.213 section 4.3 (e.g., version 17.3.0).

In some examples, RRC signaling may be used to configure SCells and a MAC-CE may be used to activate or deactivate any of the configured SCells.

RRC signaling may be used to indicate resources associated with different TRS IDs. An RRC parameter CSI-MeasConfig (of a to-be-activated SCell) may indicate a list of sCellActivationRS-Config and a list of sCellActivationRS-Config-Id. An RRC parameter sCellActivationRS-Config may indicate an ID, an NZP-CSI-RS-ResourceSet (for one TRS burst), a gap between two TRS bursts, and QCL-Info. Here, the resources may be associated with an SSB ID of a quasi-co-located SSB.

Figure 9:
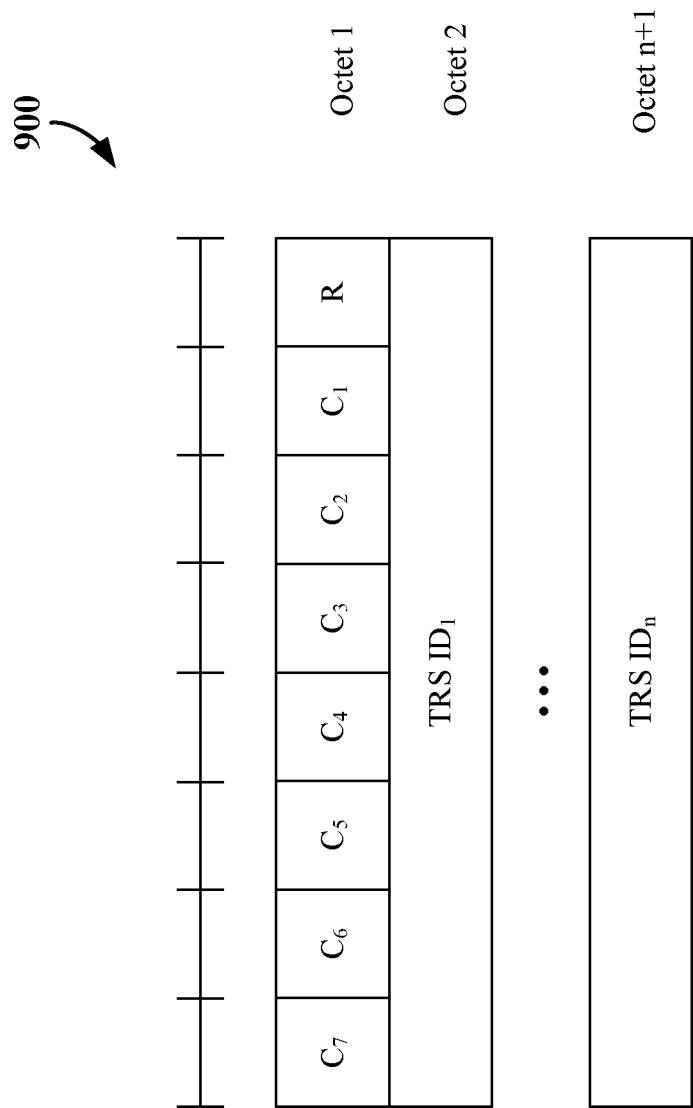
FIG. 9 is a diagram illustrating an example of messaging associated with cell activation and deactivation according to some aspects.

FIG. 9 is a diagram 900 illustrating an example of a MAC-CE for cell activation and/or deactivation. The fields $C_i$ (i.e., $C_1 \ldots C_7$) indicate activation/deactivation of the SCell with index=i. The TRS $ID_j$ field (i.e., TRS $ID_1 \ldots$ TRS $ID_n$) is the index of the triggered A-TRS for the j-th SCell among the SCell(s) activated by $C_i$. In some examples, a zero value of TRS ID corresponds to no TRS for the SCell. Thus, based on the MAC-CE information, a UE may determine which CSI-RS resources are to be monitored for T/F tracking.

Figure 10:
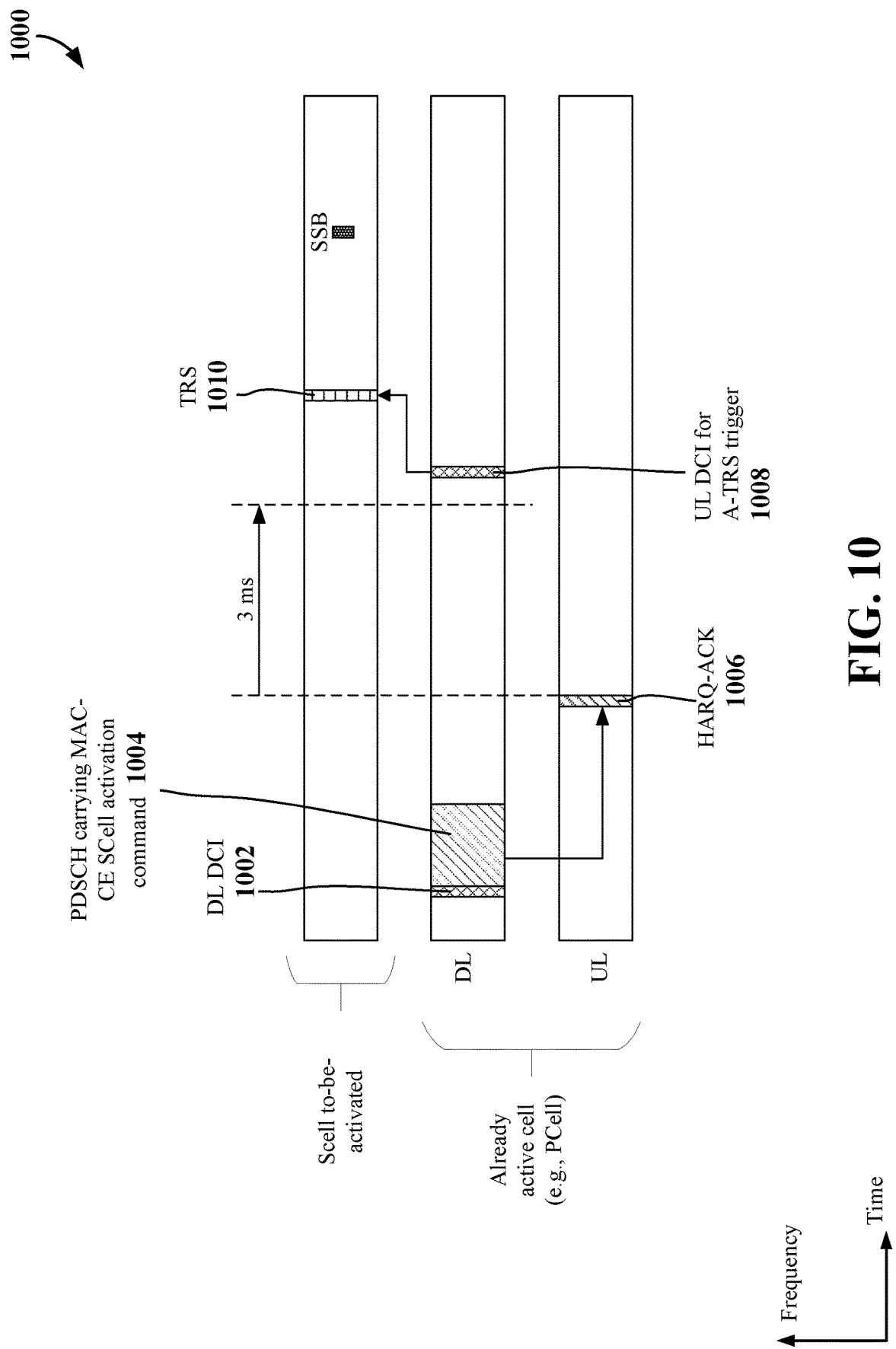
FIG. 10 is a diagram illustrating an example of signaling associated with triggering a tracking reference signal according to some aspects.

FIG. 10 is a diagram illustrating an example of signaling 1000 associated with triggering a tracking reference signal according to some aspects. A network entity (not shown) transmits a DL DCI 1002 via a PCell (not shown) to a UE (not shown), where the DCI 1002 indicates a scheduled PDSCH transmission 1004. The PDSCH transmission 1004 carries a MAC-CE that includes an SCell activation command (e.g., that activates an A-TRS). The UE transmits an ACK 1006 in response to the PDSCH transmission 1004. Following a defined period of time after the ACK 1006 (at least 3 ms in this example), the network entity transmits an UL DCI 1008 associated with an A-TRS trigger (e.g., to trigger the transmission of the TRS) via the PCell. The SCell then transmits the TRS 1010 at the scheduled time.

Figure 11:
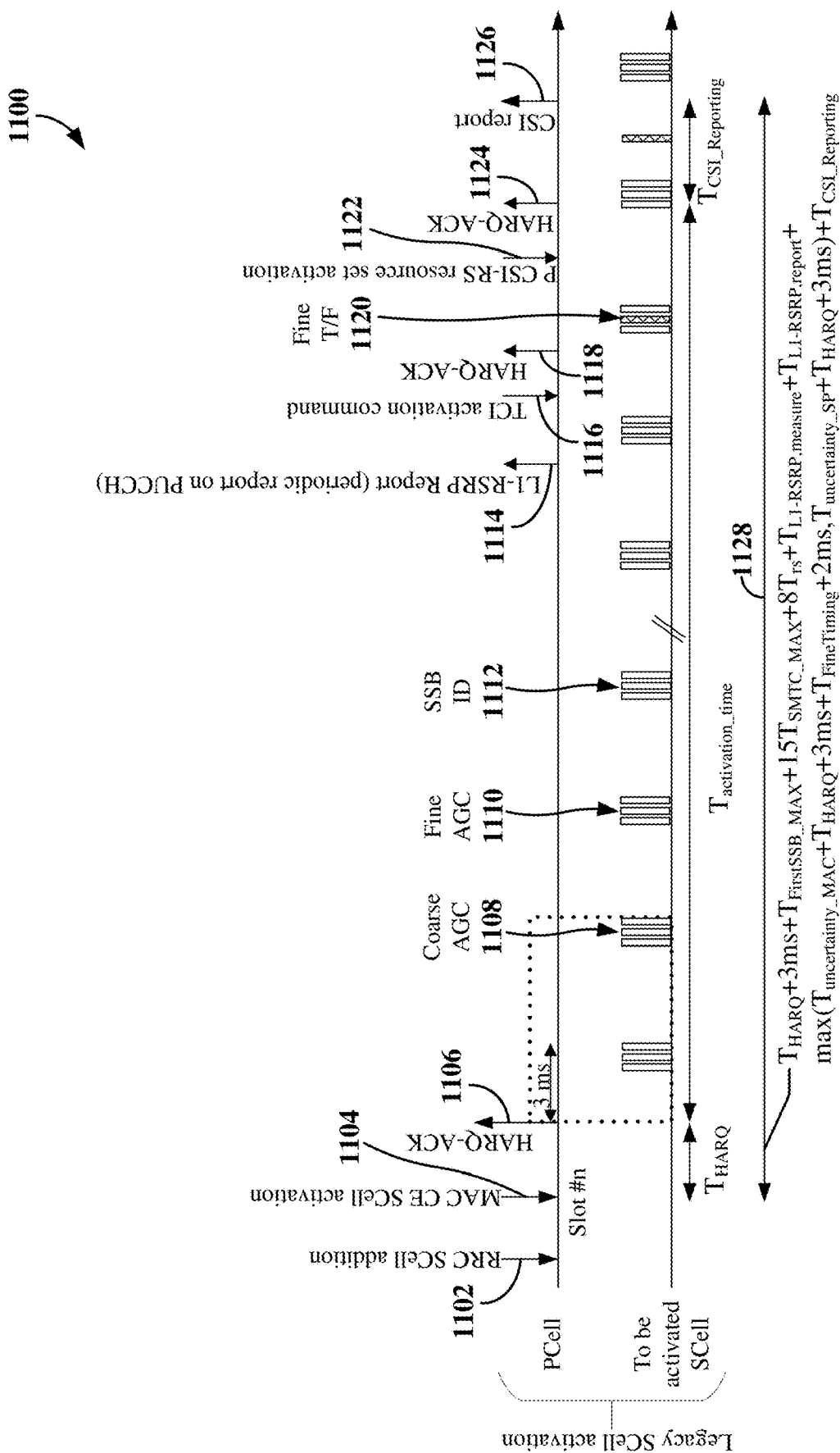
FIG. 11 is a diagram illustrating another example of signaling associated with cell activation according to some aspects.

FIG. 11 is a diagram 1100 illustrating an example of signaling associated with cell activation that may be used in an FR2 scenario according to some aspects. A network entity (e.g., a gNB, not shown) sends RRC SCell addition signaling 1102 via a PCell to a UE. The network entity then sends a MAC-CE 1104 to the UE. The MAC-CE 1104 includes an SCell activation indication for a particular SCell to be activated. In response to the MAC-CE 1104, the UE sends a HARQ-Ack 1106 to the network entity. The UE conducts coarse AGC measurements 1108, fine AGC measurements 1110, and acquires the SSB ID 1112 based on the periodic SSB signals transmitted by the SCell. The UE sends a measurement report 1114 to the network entity (e.g., on periodic reporting resources scheduled on the PUCCH). In response, the network entity sends a TCI activation command 1116 to the UE. The UE sends an ACK 1118 to the network entity and then conducts fine T/F measurements 1120 on the TRS transmitted by the SCell. The network entity sends a periodic CSI-RS (P CSI-RS) resource set activation indication 1122 to the UE and the UE sends an ACK 1124 in response. The UE then send a valid CSI report 1126 to the network entity. As indicated in FIG. 11, the total activation delay 1128 may include processing times for several SSBs. Thus, a significant delay may be associated with SCell activation. In some examples, the total activation delay 1128 may correspond to $T_{HARQ}+3$ ms$+T_{FirstSSB\_MAX}+15$ $T_{SMTC\_MAX}+8$ $T_{rs}+T_{L1\text{-}RSRP,measure}+T_{L1\text{-}RSRP,report}+\max(T_{uncertainty\_MAC}+T_{HARQ}+3$ ms$+T_{FineTiming}+2$ ms, $T_{uncertainty\_SP}\pm T_{HARQ}+3$ ms$)+T_{CSI\_Reporting}$ as shown in FIG. 11.

In conventional scenarios (e.g., 3GPP Rel-17), an A-TRS based fast SCell activation is not applicable for FR2 for an unknown SCell. For example, a UE needs to do beam sweeping in FR2 to identify the best beam among multiple beams. However, an A-TRS cannot be configured until the UE reports the SSB ID for the best beam. Thus, the unknown SCell techniques used for single beam scenarios (e.g., 3GPP Rel-17 FR1 scenarios) where the A-TRS associated with that beam is known, may not be applicable to FR2 scenarios. In some examples, the characterization of an SCell as unknown may depend on a power class of a UE (e.g., as defined in 3GPP TS 38.133 8.3.2, Scell Activation Delay Requirement for Deactivated Scell). For example, an SCell state may be defined as unknown when there is no measurement report for 4 seconds for a UE supporting power class 1 and/or power class 5. As another example, an SCell state may be defined as unknown when there is no measurement report for 3 seconds for a UE supporting power class 2 and/or power class 3 and/or power class 4. In addition, for a UE that has measured an SCell but did not report the measurement, the SCell may also be defined as unknown.

The disclosure relates in some aspects to delay reduction approaches that are applicable for different scenarios based on previous reference signal received power (RSRP) measurement history. Even though an SCell may be in unknown state, it could be considered as known because the UE has previously measured the SCell. In this case, a fast SCell activation method (e.g., with an earlier TCI activation command) may be defined accordingly.

Figure 12:
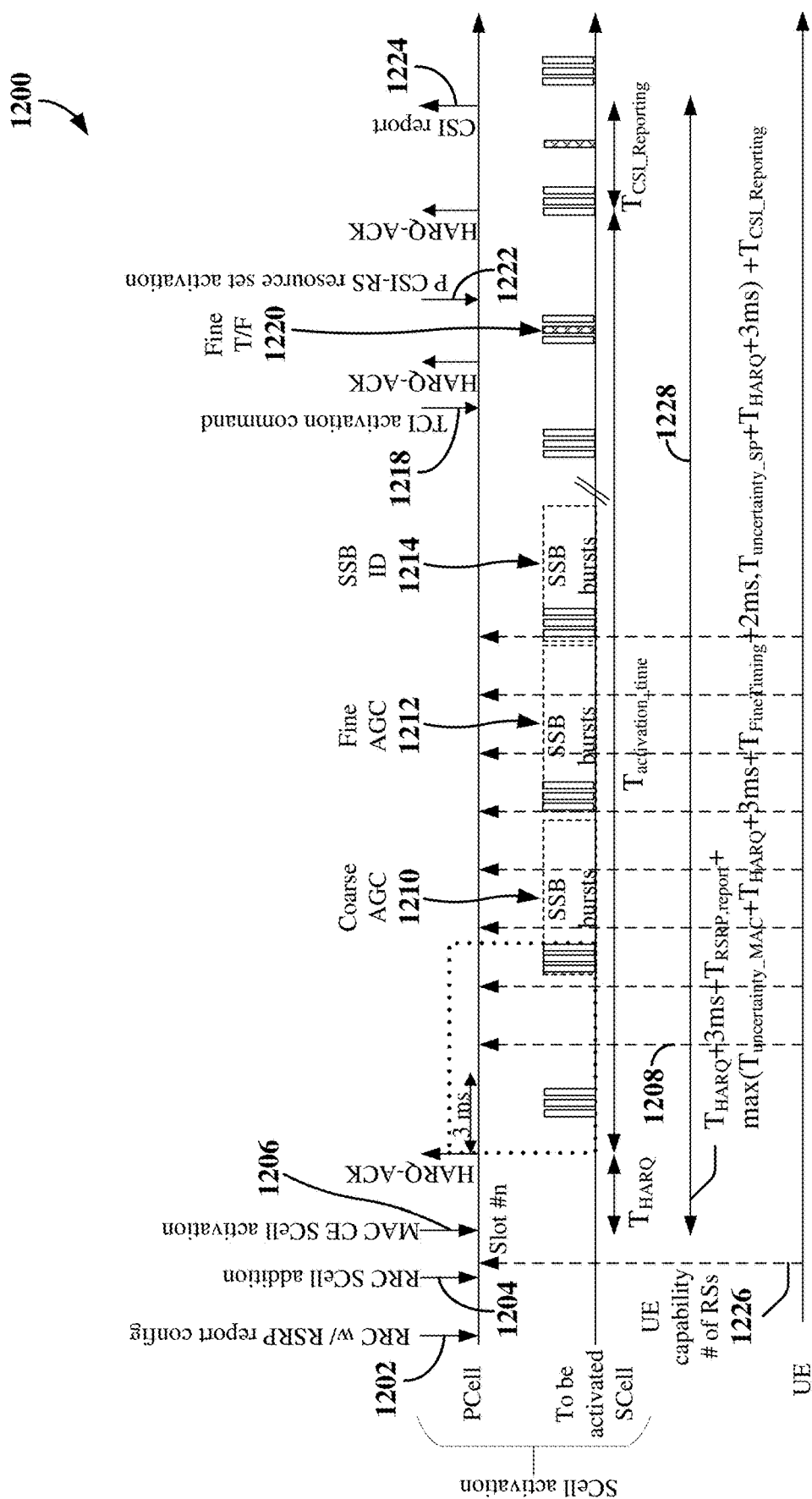
FIG. 12 is a diagram illustrating another example of signaling associated with cell activation according to some aspects.

FIG. 12 is a diagram illustrating another example of signaling associated with cell activation according to some aspects. A UE receives RRC signaling that contains an RSRP report configuration 1202. In an example scenario, the UE has an RSRP report configuration, but it has not triggered a report for a deactivated SCell (e.g., an SCell that was previously activated, then deactivated) in more than 4 seconds for a UE supporting power class 1 and/or power class 5, or in more than 3 seconds for a UE supporting power class 2 and/or power class 3 and/or power class 4. Thus, the SCell is deemed to be unknown even though the UE may have recently measured SSBs transmitted by the SCell. The UE subsequently receives an RRC SCell addition indication 1204 and a MAC-CE 1206 (SCell activation) that triggers RSRP reporting according to the RSRP report configuration. The trigger command can be placed either in the same MAC-CE with the SCell activation or in a separate MAC-CE. The UE conducts coarse AGC measurements 1210, fine AGC measurements 1212, and acquires the SSB ID 1214 based on periodic SSB bursts transmitted by the SCell.

The RSRP report configuration may configure periodic or aperiodic reporting. The dashed arrows (e.g., arrow 1208) in FIG. 12 illustrate examples of configured periodic reporting times. This reporting can occur any place within a defined time period (e.g., prior to the transmission of an TCI activation command). For example, legacy measurement requirements may specify that the maximum duration of a periodic RSRP report is [x] second or [x] ms after SSB_ID detection. In contrast with conventional cell activation procedures where RSRP is reported after acquiring an SSB ID, a UE may report RSRP much sooner in the example of FIG. 12 (e.g., since the SSBs of the SCell were previously measured when the SCell was deemed as unknown). Here, a parameter $T_{RSRP,report}$ corresponds to the delay from the receipt of a MAC-CE for SCell activation (triggered RSRP reporting) to the transmission of the RSRP report by the UE. In some examples, the UE may remeasure the previously measured SSBs and thereby quickly provide up-to-date RSRP values. Thus, the UE may receive a TCI activation command 1218 much sooner as compared to legacy activation. In some examples, an RSRP report may include a measured RSRP value (e.g., the highest measured RSRP value) along with the ID of the corresponding SSB that was measured.

For aperiodic reporting, the time for sending a report may be based on an offset (not shown in FIG. 12) from the time of the MAC-CE 1206 or some other signaling. Again, the UE may remeasure previously measured SSBs and thereby quickly provide up-to-date RSRP values to the network. Thus, the UE may receive a TCI activation command 1218 much sooner as compared to legacy activation.

In some examples, the RSRP values may be 7-bit values (e.g., defined by a table that may be used to map measured values to reported values), where the values 0 and 127 represent out-of-range values (e.g., the out-of-range values may be used to indicate that the UE has not successfully measured an SSB). When the network entity receives either an RSRP_0 or RSRP_127, the network entity expects the UE to keep reporting RSRP (e.g., during the configured periodic reporting times). When the network receives an RSRP value other than RSRP_0 or RSRP_127 (e.g., indicative of a valid RSRP measurement) with an SSB_ID, the network entity sends the TCI activation command 1218 with the associated SSB_ID to the UE to trigger CSI-RS measurements, and the UE conducts fine T/F measurements 1220 based on the SSB (associated with the received SSB ID) transmitted by the SCell. In some examples, the TCI activation command 1218 may indicate the ID of the CSI-RS that is quasi-co-located with the indicated SSB of the SCell. For example, the TCI activation command 1218 may include corresponding NZP-CSI-RS-ResourceSet and quasi-co-location (QCL) information.

The network entity sends a periodic CSI-RS resource set activation indication 1222 to the UE to enable the UE to measure a CSI-RS transmitted by the SCell (where the CSI-RS is quasi-co-located with the indicated SSB), and the UE sends an ACK in response. The UE then send a valid CSI report 1224 to the network entity, where the CSI report 1224 includes CSI based on CSI-RSI measurements conducted on the configured CSI-RS resources. As indicated in FIG. 12, the total activation delay 1228 may include processing times for several SSBs. However, in scenarios where a valid RSRP report is sent prior to acquisition of the SSB ID 1214, the total activation delay 1228 may be shorter than the total activation delay 1128 of FIG. 11. In some examples, the total activation delay 1228 may correspond to $T_{HARQ}+3$ ms+$T_{RSRP,report}$+max($T_{uncertainty\_MAC}+T_{HARQ}+3$ ms+$T_{FineTiming}+2$ ms, $T_{uncertainty\_SP}+T_{HARQ}+3$ ms)+$T_{CSI\_Reporting}$ as shown in FIG. 12. For example, the activation delay can be reduced when the UE receives a TCI activation command based on a UE reported RSRP measurement at 1208. Here, once the UE transmits an RSRP report (e.g., at arrow 1208) after receiving an SCell activation command in the MAC CE 1206, the network can transmit the TCI activation command 1218 based on reported measurement results with the SSB index from the UE. Thus, the activation delay is reduced as compared to the example of FIG. 11.

In some examples, this reporting is an optional process. For example, the UE may report RSRP while performing a legacy SCell activation process. As another example, if a UE does not have a valid measurement report, the UE may not report RSRP.

The disclosure relates in some aspects to a MAC-CE that triggers a UE to report a RSRP measurement which is configured via RRC. In some examples, the UE reports the RSRP value as a 7-bit value. In some examples, either RSRP_0 or RSRP_127 are used as the indication of UE measurement out-of-range status. In some examples, this process is applicable for an RSRP report for FR2 for an unknown SCell activation. The disclosure relates in some aspects to a MAC-CE that configures the offset to be used by the UE to report the previous RSRP (e.g., to let the UE measure before reporting). In the case of an aperiodic RSRP report configuration, the MAC-CE can configure the offset to report.

The disclosure relates in some aspects to different enhancements that may be employed depending on the RSRP report types from the UE.

A first case (Case1) applies where the RSRP measurement value is out-of-range. For a periodic RSRP report, the network expects to keep receiving RSRP reports from the UE while the UE is performing a legacy SCell activation process. For an aperiodic (one-shot) RSRP report, the network expects the UE to follow a legacy SCell activation requirement.

A second case (Case2) applies where the RSRP measurement value is not out-of-range. Here, the network assumes that the UE has measured the SCell. Thus, the network can transmit a TCI activation command with the associated SSB-ID.

The disclosure relates in some aspects to, for the case where a UE measured an SCell where the SCell is unknown, the UE may optionally send capability information 1226 to the network to indicate the number [X] of SSBs and/or TRSs (for A-TRS) that the UE can measure. This can increase measurement reliability for RSRP reporting. For example, for aperiodic RSRP reporting, the UE may indicate the number of reference signals that the UE needs to measure to obtain a good RSRP measurement. In this case, the aperiodic report time (e.g., as defined by an offset) may be scheduled to occur at a time that follows the transmission of the indicated number of reference signals.

The disclosure relates in some aspects to, when a UE report is a non-out-of-range RSRP, and the UE receives a TCI activation command with associated SSB-ID, a fine T/F measurement is based on either a DCI-based A-TRS or an SSB. When the UE report is an out-of-range RSRP, the UE may follow a legacy SCell activation delay requirement. In some examples, an A-TRS cannot be configured before an RSRP report because the network does not know the associated SSB-ID.

The disclosure relates in some aspects to a DCI-based A-TRS trigger after the UE reports the RSRP and the number of TRSs is specified.

Figure 13:
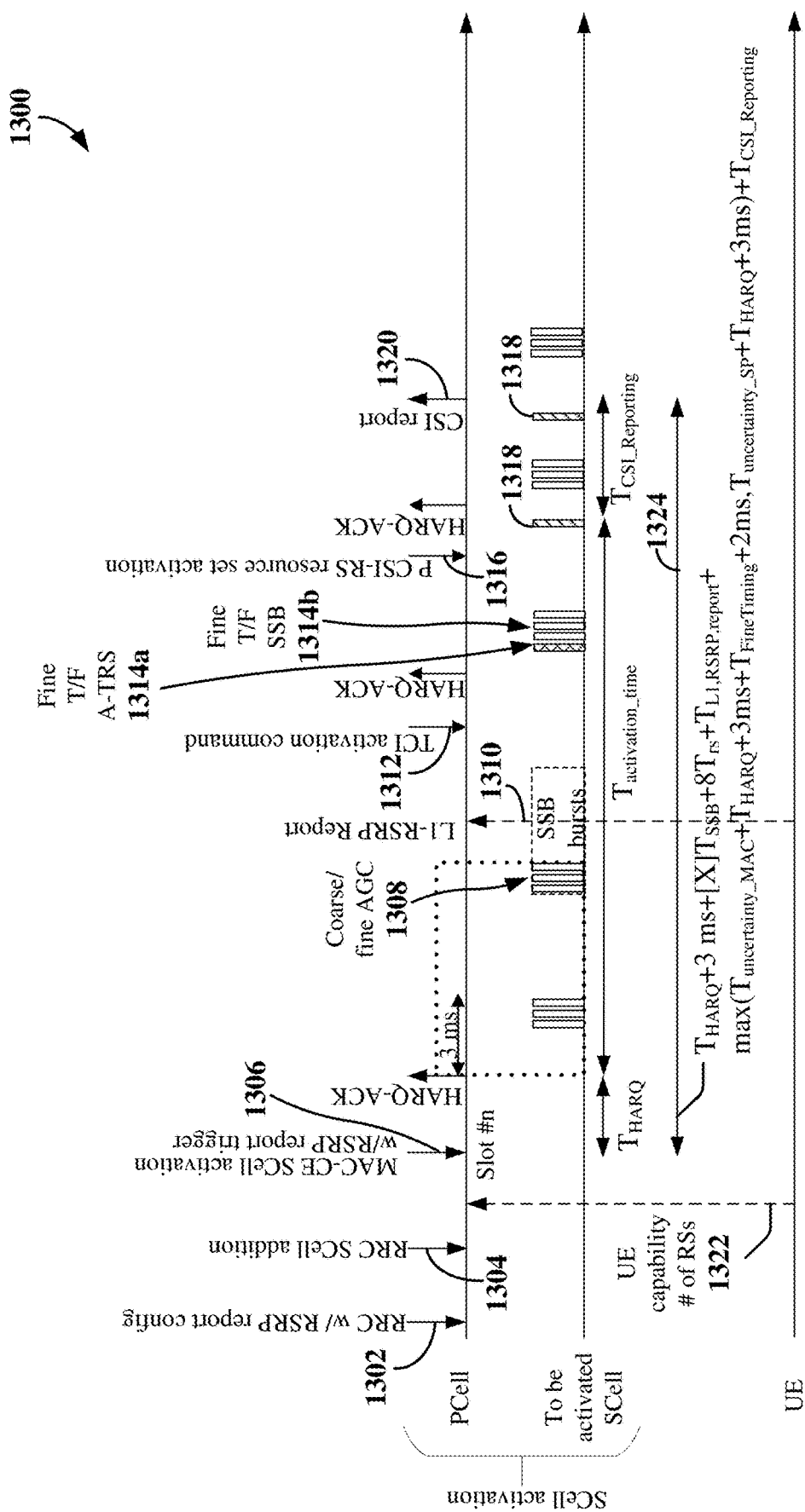
FIG. 13 is a diagram illustrating another example of signaling associated with cell activation according to some aspects.

FIG. 13 is a diagram illustrating another example of signaling associated with cell activation according to some aspects. A UE receives RRC signaling that contains an RSRP report configuration 1302. The UE subsequently receives an RRC SCell addition indication 1304 and a MAC-CE 1306 that triggers RSRP reporting according to the RSRP report configuration. The UE conducts coarse/fine AGC measurements 1308 based on an SSB burst transmitted by the SCell and sends an RSRP report 1310 to the network entity. The network entity sends a TCI activation command 1312 with the associated SSB_ID to the UE. The UE may then either conduct a fine T/F measurement 1314a on a TRS transmitted by the SCell (e.g., an A-TRS triggered by a DCI, not shown in FIG. 13) or conducts a fine T/F measurement 1314b on an SSB transmitted by the SCell (e.g., on an SSB associated with the SSB ID indicated by the TCI activation command 1312). The network entity sends a periodic CSI-RS resource set activation indication 1316 to the UE that activates CSI-RS resources 1318 for UE CSI-RS measurements, and the UE sends an ACK in response. The UE then sends a valid CSI report 1320 to the network entity, where the CSI report 1320 includes CSI based on the CSI-RS measurements (e.g., that employ quasi-co-location information indicated by the TCI activation command 1312).

As mentioned above in the discussion of the capability information 1226 of FIG. 12, the UE may transmit capability information to the network entity, where the capability information may optionally indicate the number of reference signals 1322 (e.g., SSBs and/or TRSs) that the UE is configured to measure. As indicated in FIG. 13, the total activation delay 1324 may include processing times for one or more SSBs. However, the total activation delay 1324 may be shorter than the total activation delay 1128 of FIG. 11. In some examples, the total activation delay 1324 may correspond to $T_{HARQ}+3$ ms+[X] $T_{SSB}+T_{L1\text{-}RSRP,report}+\max(T_{uncertainty\_MAC}+T_{HARQ}+3$ ms$+T_{FineTiming}+2$ MS, $T_{uncertainty\_SP}+T_{HARQ}+3$ ms)$+T_{CSI\_Reporting}$ as shown in FIG. 13.

Figure 14:
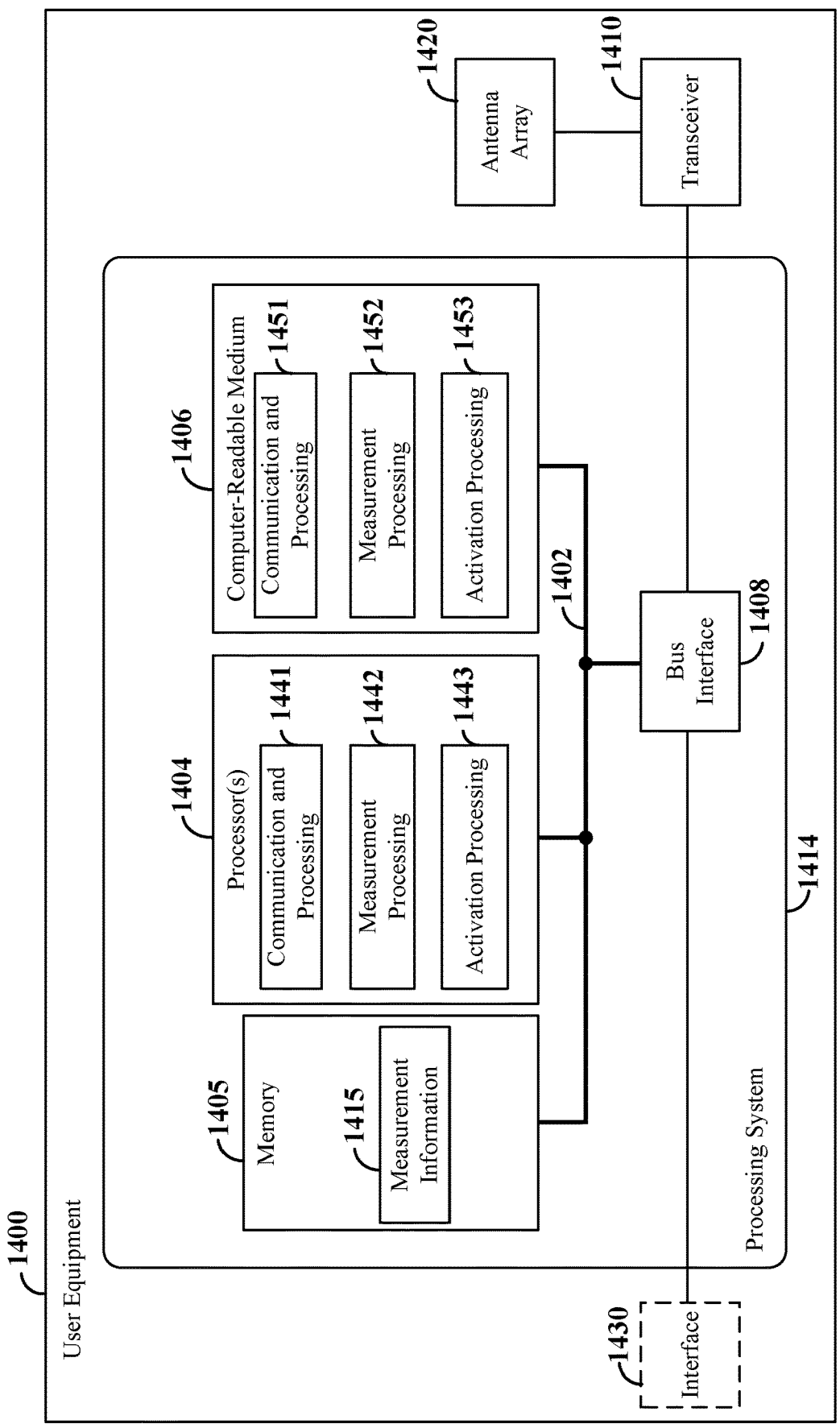
FIG. 14 is a block diagram conceptually illustrating an example of a hardware implementation for a user equipment employing a processing system according to some aspects.

FIG. 14 is a block diagram illustrating an example of a hardware implementation for a UE 1400 employing a processing system 1414. For example, the UE 1400 may be a device configured to wirelessly communicate with a network entity, as discussed in any one or more of FIGS. 1-13. In some implementations, the UE 1400 may correspond to any of the UEs or scheduled entities shown in any of FIGS. 1, 2, 3, and 6.

In accordance with various aspects of the disclosure, an element, or any portion of an element, or any combination of elements may be implemented with the processing system 1414. The processing system 1414 may include one or more processors 1404 (hereafter referred to as the processor 1404, at least one processor 1404, or the processors 1404 for convenience). Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in a UE 1400, may be used to implement any one or more of the processes and procedures described herein. In various examples, at least one processor may be configured to individually or collectively implement any one or more of the processes and procedures described herein. As one example, a single processor may perform all of the operations of a given process. As another example, a first processor may perform a one set of operations of a process, a second processor may perform another set of operations of the process, and so on. As yet another example, multiple processors may cooperate to perform one or more operations of a process. Other combinations are possible. In any of these examples, a given processor may execute corresponding processor-readable code stored in a memory.

The processor 1404 may in some instances be implemented via a baseband or modem chip and in other implementations, the processor 1404 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402, a transceiver 1410 and an antenna array 1420 and between the bus 1402 and an interface 1430. The transceiver 1410 provides a communication interface or means for communicating with various other apparatus over a wireless transmission medium. The interface 1430 provides a communication interface or means of communicating with various other apparatuses and devices (e.g., other devices housed within the same apparatus as the UE 1400 or other external apparatuses) over an internal bus or external transmission medium, such as an Ethernet cable. Depending upon the nature of the apparatus, the interface 1430 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store measurement information 1415 (e.g., cell activation information) used by the processor 1404 for the communication operations described herein.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1400 may be configured to perform any one or more of the operations described herein (e.g., as described above in conjunction with FIGS. 1-13 and as described below in conjunction with FIG. 15). In some aspects of the disclosure, the processor 1404, as utilized in the UE 1400, may include circuitry configured for various functions.

The processor 1404 may include communication and processing circuitry 1441. The communication and processing circuitry 1441 may be configured to communicate with a network entity, such as a gNB. The communication and processing circuitry 1441 may be configured to communicate with a network entity and one or more other wireless communication devices over a common carrier shared between a cellular (e.g., Uu) interface and a sidelink (e.g., PC5) interface. The communication and processing circuitry 1441 may include one or more hardware components that provide the physical structure that performs various processes related to wireless communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. In some examples, the communication and processing circuitry 1441 may include two or more transmit/receive chains (e.g., one chain to communicate with a network entity and another chain to communicate with a sidelink device). The communication and processing circuitry 1441 may further be configured to execute communication and processing software 1451 included on the computer-readable medium 1406 to implement one or more functions described herein.

In some implementations where the communication involves receiving information, the communication and processing circuitry 1441 may obtain information from a component of the UE 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may receive one or more of signals, messages, SCIs, feedback, other information, or any combination thereof. In some examples, the communication and processing circuitry 1441 may receive information via one or more of a PSCCH, a PSSCH, a PSFCH, some other type of channel, or any combination thereof. In some examples, the communication and processing circuitry 1441 may include functionality for a means for receiving. In some examples, the communication and processing circuitry 1441 may include functionality for a means for decoding.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may send one or more of signals, messages, SCIs, feedback, other information, or any combination thereof. In some examples, the communication and processing circuitry 1441 may send information via one or more of a PSCCH, a PSSCH, a PSFCH, some other type of channel, or any combination thereof. In some examples, the communication and processing circuitry 1441 may include functionality for a means for transmitting. In some examples, the communication and processing circuitry 1441 may include functionality for a means for encoding.

The processor 1404 may include measurement processing circuitry 1442 configured to perform measurement processing-related operations as discussed herein (e.g., one or more of the operations described above in conjunction with FIGS. 7-13). The measurement processing circuitry 1442 may be configured to execute measurement processing software 1452 included on the computer-readable medium 1406 to implement one or more functions described herein.

The measurement processing circuitry 1442 may include functionality for a means for receiving (e.g., as described above in conjunction with FIGS. 7-13). For example, the measurement processing circuitry 1442 may cooperate with the communication and processing circuitry 1441 to receive a measurement report configuration from a network entity (e.g., via RRC signaling). As another example, the measurement processing circuitry 1442 may cooperate with the communication and processing circuitry 1441 to receive a message from a network entity (e.g., via a PDSCH or a PDCCH). In some examples, the message may indicate that the user equipment is to report measurements of the first cell based on the measurement report configuration. As a further example, the measurement processing circuitry 1442 may cooperate with the communication and processing circuitry 1441 to receive a TCI activation command from a network entity. As another example, the measurement processing circuitry 1442 may cooperate with the communication and processing circuitry 1441 to receive a MAC-CE and/or DCI from a network entity. As another example, the measurement processing circuitry 1442 may cooperate with the communication and processing circuitry 1441 to receive a CSI-RS resource set activation from a network entity.

The measurement processing circuitry 1442 may include functionality for a means for measuring signals (e.g., as described above in conjunction with FIGS. 7-13). For example, the measurement processing circuitry 1442 may cooperate with the communication and processing circuitry 1441 to measure (e.g., aperiodically measure and/or periodically measure) reference signals (e.g., SSB signals, a TRS, a CSI-RS, etc.) transmitted by a cell (e.g., an SCell). In some examples, the measurement processing circuitry 1442 may cooperate with the communication and processing circuitry 1441 to measure signals received from a cell when the cell is not activated with respect to the UE 1400 (e.g., the cell is not activated as an SCell for the UE 1400). As another example, the measurement processing circuitry 1442 may cooperate with the communication and processing circuitry 1441 to perform AGC measurements. As a further example, the measurement processing circuitry 1442 may cooperate with the communication and processing circuitry 1441 to acquire SSB ID information from an SSB signal. As another example, the measurement processing circuitry 1442 may cooperate with the communication and processing circuitry 1441 to perform T/F measurements.

The measurement processing circuitry 1442 may include functionality for a means for generating a measurement report (e.g., as described above in conjunction with FIGS. 7-13). For example, the measurement processing circuitry 1442 may generate a measurement report based on RSRP measurements and/or CSI-RS measurements.

The measurement processing circuitry 1442 may include functionality for a means for setting a parameter (e.g., as described above in conjunction with FIGS. 7-13). For example, the measurement processing circuitry 1442 may set an RSRP parameter for a measurement report to a particular value.

The measurement processing circuitry 1442 may include functionality for a means for transmitting (e.g., as described above in conjunction with FIGS. 7-13). For example, the measurement processing circuitry 1442 may cooperate with the communication and processing circuitry 1441 to transmit (e.g., aperiodically transmit and/or periodically transmit) a measurement report to a network entity. As another example, the measurement processing circuitry 1442 may cooperate with the communication and processing circuitry 1441 to transmit a message to a network entity (e.g., via a PUSCH or a PUCCH). As a further example, the measurement processing circuitry 1442 may cooperate with the communication and processing circuitry 1441 to transmit capability information to a network entity. As another example, the measurement processing circuitry 1442 may cooperate with the communication and processing circuitry 1441 to transmit a measurement report responsive to a received message that indicates that the UE 1400 is to report measurements of the first cell based on the measurement report configuration.

The measurement processing circuitry 1442 may include functionality for a means for performing time tracking (e.g., as described above in conjunction with FIGS. 7-13). For example, the measurement processing circuitry 1442 may cooperate with the communication and processing circuitry 1441 to perform time tracking based on an SSB transmission by a cell.

The measurement processing circuitry 1442 may include functionality for a means for performing frequency tracking (e.g., as described above in conjunction with FIGS. 7-13). For example, the measurement processing circuitry 1442 may cooperate with the communication and processing circuitry 1441 to perform frequency tracking based on an SSB transmission by a cell.

The processor 1404 may include activation processing circuitry 1443 configured to perform activation processing-related operations as discussed herein (e.g., one or more of the operations described above in conjunction with FIGS. 7-13). The activation processing circuitry 1443 may be configured to execute activation processing software 1453 included on the computer-readable medium 1406 to implement one or more functions described herein.

The activation processing circuitry 1443 may include functionality for a means for receiving a message (e.g., as described above in conjunction with FIGS. 7-13). For example, the activation processing circuitry 1443 may cooperate with the communication and processing circuitry 1441 to receive a message (e.g., for a cell addition or a cell activation) from network entity on designated resources. As another example, the activation processing circuitry 1443 may cooperate with the communication and processing circuitry 1441 to receive a TCI activation command from a network entity.

The activation processing circuitry 1443 may include functionality for a means for transmitting a message (e.g., as described above in conjunction with FIGS. 7-13). For example, the activation processing circuitry 1443 may cooperate with the communication and processing circuitry 1441 to transmit a message to a network entity on designated resources.

Figure 15:
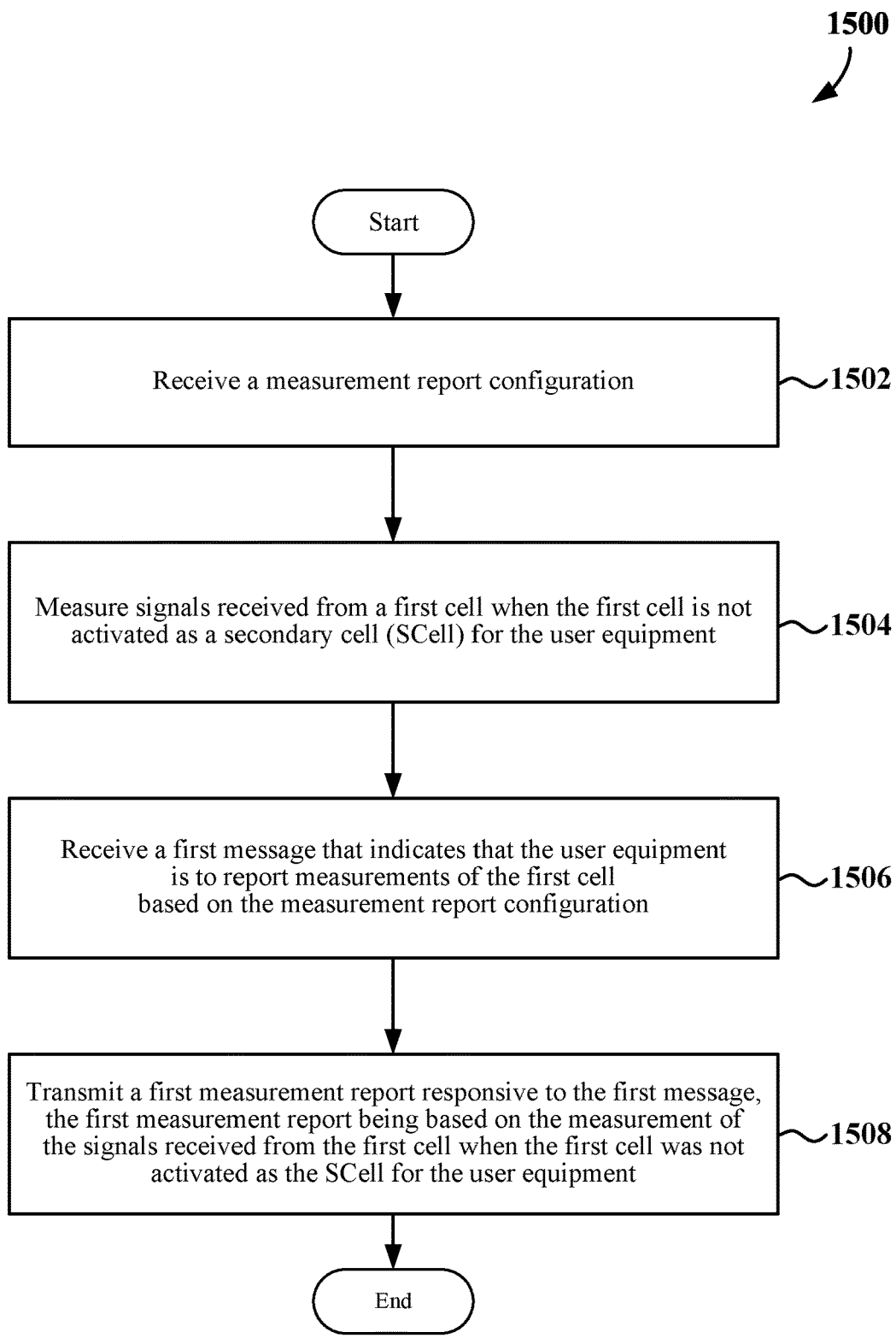
FIG. 15 is a flow chart illustrating an example wireless communication method associated with cell activation according to some aspects.

FIG. 15 is a flow chart illustrating an example method 1500 for wireless communication in accordance with some aspects of the present disclosure. As described below, some or all illustrated features may be omitted in a particular implementation within the scope of the present disclosure, and some illustrated features may not be required for implementation of all examples. In some examples, the method 1500 (method for wireless communication) may be carried out by the UE 1400 illustrated in FIG. 14. In some examples, the method 1500 may be carried out by any suitable apparatus or means for carrying out the functions or algorithm described below.

At block 1502, a user equipment may receive a measurement report configuration. In some examples, the measurement processing circuitry 1442 together with the communication and processing circuitry 1441 and the transceiver 1410, shown and described in FIG. 14, may provide a means to receive a measurement report configuration. In some examples, the communication and processing circuitry 1441 and the transceiver 1410, shown and described in FIG. 14, may provide a means to receive a measurement report configuration.

At block 1504, the user equipment may measure signals received from a first cell when the first cell is not activated as a secondary cell (SCell) for the user equipment. In some examples, the measurement processing circuitry 1442, shown and described in FIG. 14, may provide a means to measure signals received from a first cell when the first cell is not activated as a secondary cell (SCell) for the user equipment. In some examples, the measurement processing circuitry 1442 together with the communication and processing circuitry 1441 and the transceiver 1410, shown and described in FIG. 14, may provide a means to measure signals received from a first cell when the first cell is not activated as a secondary cell (SCell) for the user equipment.

At block 1506, the user equipment may receive a first message that indicates that the user equipment is to report measurements of the first cell based on the measurement report configuration. In some examples, the measurement processing circuitry 1442 together with the communication and processing circuitry 1441 and the transceiver 1410, shown and described in FIG. 14, may provide a means to receive a first message that indicates that the user equipment is to report measurements of the first cell based on the measurement report configuration. In some examples, the communication and processing circuitry 1441 and the transceiver 1410, shown and described in FIG. 14, may provide a means to receive a first message that indicates that the user equipment is to report measurements of the first cell based on the measurement report configuration.

At block 1508, the user equipment may transmit a first measurement report responsive to the first message, the first measurement report being based on the measurement of the signals received from the first cell when the first cell was not activated as the SCell for the user equipment. In some examples, the measurement processing circuitry 1442 together with the communication and processing circuitry 1441 and the transceiver 1410, shown and described in FIG. 14, may provide a means to transmit a first measurement report responsive to the first message, the first measurement report being based on the measurement of the signals received from the first cell when the first cell was not activated as the SCell for the user equipment. In some examples, the communication and processing circuitry 1441 and the transceiver 1410, shown and described in FIG. 14, may provide a means to transmit a first measurement report responsive to the first message, the first measurement report being based on the measurement of the signals received from the first cell when the first cell was not activated as the SCell for the user equipment.

In some examples, the first cell communicates via frequency range 2 (FR2) signaling.

In some examples, the user equipment may receive a transmission configuration indication (TCI) activation command after transmitting (transmission of) the first measurement report. In some examples, the TCI activation command may indicate quasi-co-location information for a channel state information-reference signal (CSI-RS) transmitted by the first cell. In some examples, the user equipment may transmit a second measurement report based on a measurement of the CSI-RS transmitted by the first cell.

In some examples, the user equipment may receive a transmission configuration indication (TCI) activation command after transmitting the first measurement report. In some examples, the TCI activation command may indicate a synchronization signal block (SSB) identifier associated with the first cell. In some examples, the TCI activation command may further indicate a timing reference signal (TRS) transmitted by the first cell. In some examples, the user equipment may measure the TRS transmitted by the first cell. In some examples, the user equipment may transmit a second measurement report based on the measuring (measurement) of the TRS transmitted by the first cell.

In some examples, the first measurement report may include a 7-bit reference signal received power (RSRP) parameter. In some examples, the user equipment may set the RSRP parameter to a value of 0 or 127 to indicate that the first measurement report does not include a valid measurement value. In some examples, the measurement report configuration may include an RSRP report configuration.

In some examples, the measurement report configuration specifies aperiodic reporting. In some examples, the measurement report configuration specifies periodic reporting.

In some examples, receiving the measurement report configuration may include receiving a radio resource control (RRC) message that includes the measurement report configuration. In some examples, the first message may include a medium access control-control element (MAC-CE). In some examples, the MAC-CE indicates that the first cell is being activated as the SCell for the user equipment. In some examples, the user equipment may receive another MAC-CE that indicates that the first cell is being activated as the SCell for the user equipment.

In some examples, the measurement report configuration specifies aperiodic reporting. In some examples, the first message specifies a time offset that the user equipment is to use when transmitting an aperiodic measurement report.

In some examples, the first measurement report may include a parameter that indicates that the first measurement report does not include a valid measurement value. In some examples, the measurement report configuration specifies periodic reporting. In some examples, the user equipment may periodically measure synchronization signal block (SSB) signals transmitted by the first cell. In some examples, the user equipment may periodically transmit second measurement reports based on the measuring of the SSB signals.

In some examples, the first measurement report may include a parameter that indicates that the first measurement report does not include a valid measurement value. In some examples, the measurement report configuration specifies aperiodic reporting. In some examples, the user equipment may measure a synchronization signal block (SSB) signal transmitted by the first cell. In some examples, the user equipment may transmit a second measurement report based on the measuring of the SSB signal.

In some examples, the first measurement report may include a valid measurement value. In some examples, the user equipment may receive a transmission configuration indication (TCI) activation command after transmitting the first measurement report. In some examples, the TCI activation command may indicate a synchronization signal block (SSB) identifier associated with the first cell. In some examples, the user equipment may perform at least one of time tracking or frequency tracking based on an SSB transmission by the first cell. In some examples, the SSB transmission is associated with the SSB identifier.

In some examples, the first measurement report may include a valid measurement value. In some examples, the user equipment may receive a transmission configuration indication (TCI) activation command after transmitting the first measurement report. In some examples, the TCI activation command may indicate a synchronization signal block (SSB) identifier associated with the first cell. In some examples, the TCI activation command may further indicate a timing reference signal (TRS) transmitted by the first cell. In some examples, the user equipment may measure the TRS transmitted by the first cell. In some examples, the user equipment may transmit a second measurement report based on the measuring of the TRS transmitted by the first cell.

In some examples, the user equipment may transmit a second message that may include an indication of a quantity of reference signals that the user equipment is configured to measure (e.g., for aperiodic or periodic measurement reporting). In some examples, the reference signals may include synchronization signal blocks (SSBs) or timing reference signals (TRSs).

In some examples, the first measurement report may include a valid measurement value. In some examples, the user equipment may receive a transmission configuration indication (TCI) activation command after transmitting the first measurement report. In some examples, the TCI activation command may indicate a synchronization signal block (SSB) identifier associated with the first cell. In some examples, the user equipment may measure synchronization signal blocks (SSBs) transmitted by the first cell. In some examples, the user equipment may transmit a second measurement report based on the measuring of the SSBs transmitted by the first cell.

In some examples, the first measurement report may include a valid measurement value. In some examples, the user equipment may receive a transmission configuration indication (TCI) activation command after transmitting the first measurement report. In some examples, the TCI activation command may indicate a synchronization signal block (SSB) identifier associated with the first cell. In some examples, the user equipment may receive downlink control information (DCI) indicating at least one timing reference signal (TRS) transmitted by the first cell. In some examples, the user equipment may measure the at least one TRS transmitted by the first cell. In some examples, the user equipment may transmit a second measurement report based on the measuring of the at least one TRS transmitted by the first cell.

In some examples, the user equipment may receive downlink control information after transmitting the first measurement report. In some examples, the downlink control information may indicate at least one aperiodic tracking reference signal (A-TRS) transmission by the first cell. In some examples, the user equipment may perform at least one of time tracking or frequency tracking based on the at least one A-TRS transmission by the first cell. In some examples, the user equipment may transmit a second message that may include an indication of a quantity of timing reference signals (TRSs) that the user equipment is configured to measure. In some examples, the at least one A-TRS transmission indicated by the downlink control information corresponds to the quantity of TRSs that the user equipment is configured to measure.

Referring again to FIG. 14, in one configuration, the UE 1400 includes means for receiving a measurement report configuration, means for measuring signals received from a first cell when the first cell is not activated as a secondary cell (SCell) for the user equipment, means for receiving a first message that indicates that the user equipment is to report measurements of the first cell based on the measurement report configuration, and means for transmitting a first measurement report responsive to the first message, the first measurement report being based on the measuring the signals received from the first cell when the first cell was not activated as the SCell for the user equipment. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 3, 6, and 14, and utilizing, for example, the methods and/or algorithms described herein in relation to FIG. 15.

Figure 16:
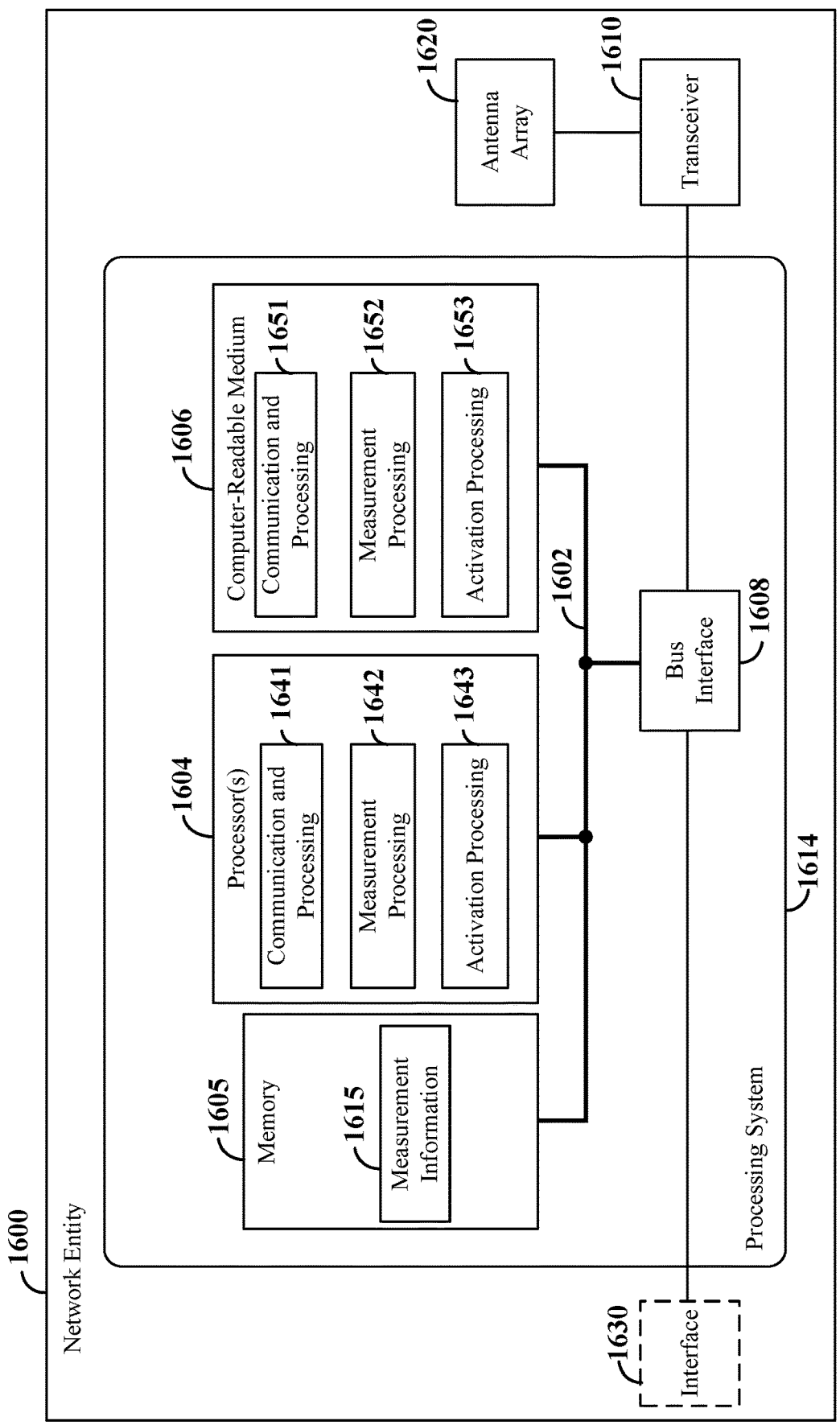
FIG. 16 is a block diagram conceptually illustrating an example of a hardware implementation for a network entity employing a processing system according to some aspects.

FIG. 16 is a conceptual diagram illustrating an example of a hardware implementation for a network entity 1600 employing a processing system 1614. In some implementations, the network entity 1600 may correspond to any of the base stations, CUs, DUs, RUs, or scheduling entities shown in any of FIGS. 1, 2, 3, and 6.

In accordance with various aspects of the disclosure, an element, or any portion of an element, or any combination of elements may be implemented with the processing system 1614. The processing system may include one or more processors 1604 (hereafter referred to as the processor 1604, at least one processor 1604, or the processors 1604 for convenience). The processing system 1614 may be substantially the same as the processing system 1414 illustrated in FIG. 14, including a bus interface 1608, a bus 1602, memory 1605, the processor 1604, a computer-readable medium 1606, a transceiver 1610, and an antenna array 1620. The memory 1605 may store measurement information 1615 (e.g., cell activation information) used by the processor 1604 in cooperation with the transceiver 1610 for communication operations as described herein. Furthermore, the network entity 1600 may include an interface 1630 (e.g., a network interface) that provides a means for communicating with at least one other apparatus within a core network and with at least one radio access network. The processor 1604, as utilized in the network entity 1600, may be used to implement any one or more of the processes and procedures described herein. In various examples, at least one processor 1604 may be configured to individually or collectively implement any one or more of the processes and procedures described herein.

The network entity 1600 may be configured to perform any one or more of the operations described herein (e.g., as described above in conjunction with FIGS. 1-13 and as described below in conjunction with FIG. 17). In some aspects of the disclosure, the processor 1604, as utilized in the network entity 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple scheduled entities. The processor 1604 may be configured to schedule resources for the transmission of downlink signals. The processor 1604 may further be configured to schedule resources for the transmission of uplink signals.

In some aspects of the disclosure, the processor 1604 may include communication and processing circuitry 1641. The communication and processing circuitry 1641 may be configured to communicate with a user equipment. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

The communication and processing circuitry 1641 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1641 may further be configured to receive a scheduling request from a UE for an uplink grant or a sidelink grant.

In some implementations wherein the communication involves receiving information, the communication and processing circuitry 1641 may obtain information from a component of the network entity 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for transmitting. In some examples, the communication and processing circuitry 1641 may include functionality for a means for encoding.

The processor 1604 may include measurement processing circuitry 1642 configured to perform measurement processing-related operations as discussed herein (e.g., one or more of the operations described above in conjunction with FIGS. 7-13). The measurement processing circuitry 1642 may be configured to execute measurement processing software 1652 included on the computer-readable medium 1606 to implement one or more functions described herein.

The measurement processing circuitry 1642 may include functionality for a means for transmitting (e.g., as described above in conjunction with FIGS. 7-13). For example, the measurement processing circuitry 1642 may cooperate with the communication and processing circuitry 1641 to transmit a measurement report configuration to a UE (e.g., via RRC signaling). As another example, the measurement processing circuitry 1642 may cooperate with the communication and processing circuitry 1641 to transmit a message to a UE (e.g., via a PDSCH or a PDCCH). In some examples, the message may indicate that the UE is to report measurements of a cell based on the measurement report configuration, in a situation where the cell is not activated with respect to the UE prior to (and/or during) the transmission of the message (e.g., the cell is not activated as an SCell for the UE prior to and/or during the transmission of the message). As a further example, the measurement processing circuitry 1642 may cooperate with the communication and processing circuitry 1641 to transmit a TCI activation command to a UE. As another example, the measurement processing circuitry 1642 may cooperate with the communication and processing circuitry 1641 to transmit a MAC-CE and/or DCI to a UE. As another example, the measurement processing circuitry 1642 may cooperate with the communication and processing circuitry 1641 to transmit a CSI-RS resource set activation to a UE.

The measurement processing circuitry 1642 may include functionality for a means for receiving (e.g., as described above in conjunction with FIGS. 7-13). For example, the measurement processing circuitry 1642 may cooperate with the communication and processing circuitry 1641 to receive (e.g., aperiodically receive and/or periodically receive) at least one measurement report from a UE. For example, the measurement processing circuitry 1642 may receive, from a UE, a measurement report based on RSRP measurements and/or CSI-RS measurements. In some examples, the measurement report is responsive to a message that indicates that the UE is to report measurements of a cell based on a measurement report configuration. In some examples, the measurement report is based on UE measurements of signals received from a cell when the cell is not activated with respect to the UE. As another example, the measurement processing circuitry 1642 may cooperate with the communication and processing circuitry 1641 to receive a message from a UE (e.g., via a PUSCH or a PUCCH). As a further example, the measurement processing circuitry 1642 may cooperate with the communication and processing circuitry 1641 to receive capability information from a UE.

The processor 1604 may include activation processing circuitry 1643 configured to perform activation processing-related operations as discussed herein (e.g., one or more of the operations described above in conjunction with FIGS. 7-13). The activation processing circuitry 1643 may be configured to execute activation processing software 1653 included on the computer-readable medium 1606 to implement one or more functions described herein.

The activation processing circuitry 1643 may include functionality for a means for transmitting a message (e.g., as described above in conjunction with FIGS. 7-13). For example, the activation processing circuitry 1643 may cooperate with the communication and processing circuitry 1641 to transmit a message (e.g., for a cell addition or a cell activation) to a UE on designated resources. As another example, the activation processing circuitry 1643 may cooperate with the communication and processing circuitry 1641 to transmit a TCI activation command to a UE. In some examples, the activation processing circuitry 1643 may cooperate with the communication and processing circuitry 1641 to transmit the TCI activation command after (e.g., responsive to) receiving a measurement report from the UE.

The activation processing circuitry 1643 may include functionality for a means for receiving a message (e.g., as described above in conjunction with FIGS. 7-13). For example, the activation processing circuitry 1643 may cooperate with the communication and processing circuitry 1641 to receive a message from a UE on designated resources.

In some examples, the network entity 1600 shown and described above in connection with FIG. 16 may be a disaggregated base station. For example, the network entity 1600 shown in FIG. 16 may include the CU and optionally one or more DUs/RUs of the disaggregated base station. Other DUs/RUs associated with the network entity 1600 may be distributed throughout the network. In some examples, the DUs/RUs may correspond to TRPs associated with the network entity. In some examples, the CU and/or DU/RU of the disaggregated base station (e.g., within the network entity 1600) may generate activation information and provide the information to a user equipment, as well as receive and process messages from the user equipment.

Figure 17:
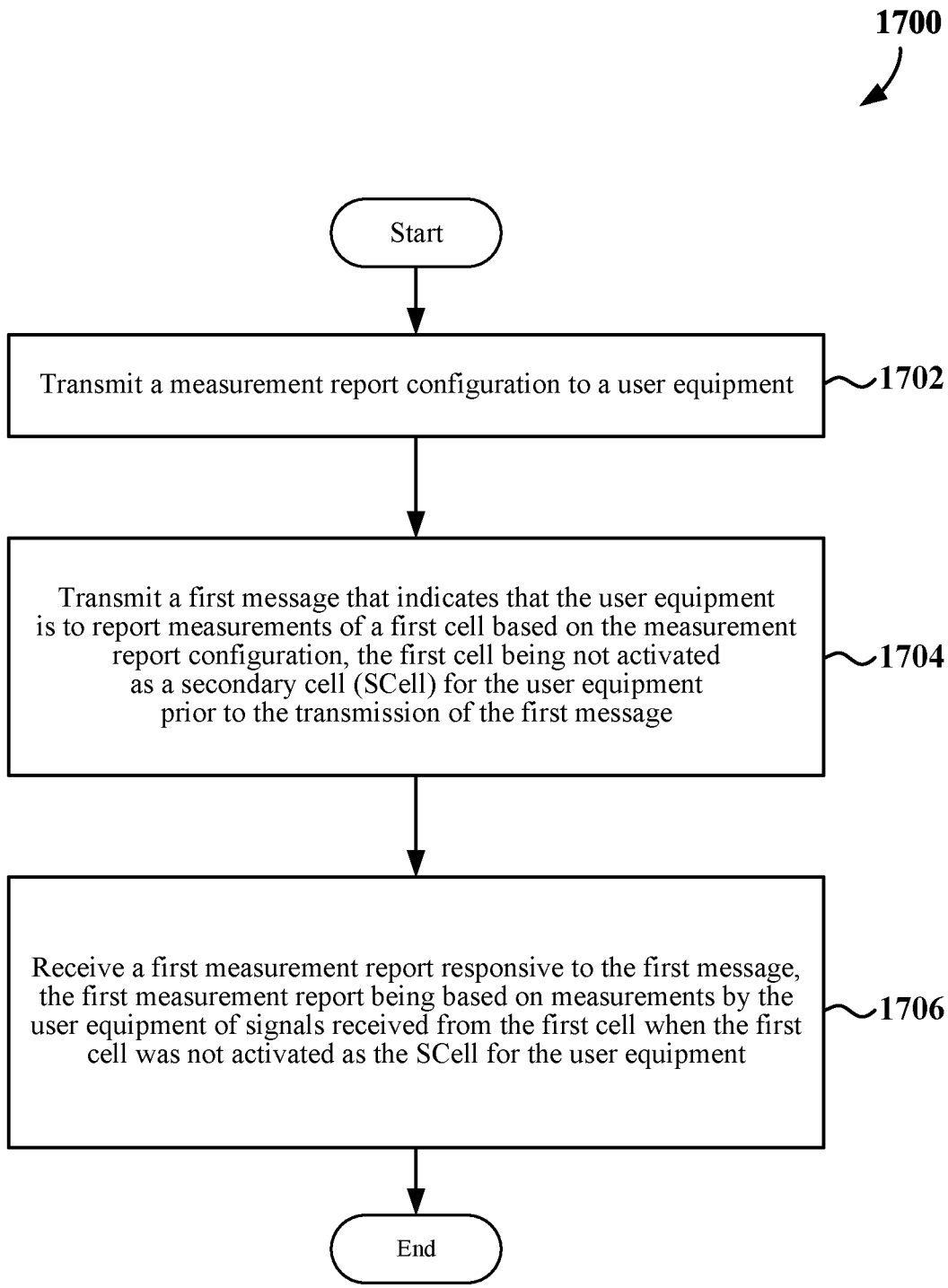
FIG. 17 is a flow chart illustrating an example wireless communication method associated with cell activation according to some aspects.

FIG. 17 is a flow chart illustrating an example method 1700 for wireless communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the network entity 1600 illustrated in FIG. 16. In some examples, the method 1700 may be carried out by any suitable apparatus or means for carrying out the functions or algorithm described below.

At block 1702, a network entity may transmit a measurement report configuration to a user equipment. In some examples, the measurement processing circuitry 1642 together with the communication and processing circuitry 1641 and the transceiver 1610, shown and described in FIG. 16, may provide a means to transmit a measurement report configuration to a user equipment. In some examples, the communication and processing circuitry 1641 and the transceiver 1610, shown and described in FIG. 16, may provide a means to transmit a measurement report configuration to a user equipment.

At block 1704, the network entity may transmit a first message that indicates that the user equipment is to report measurements of a first cell based on the measurement report configuration, the first cell being not activated as a secondary cell (SCell) for the user equipment prior to the transmission of the first message. In some examples, the activation processing circuitry 1643 together with the communication and processing circuitry 1641 and the transceiver 1610, shown and described in FIG. 16, may provide a means to transmit a first message that indicates that the user equipment is to report measurements of a first cell based on the measurement report configuration, the first cell being not activated as a secondary cell (SCell) for the user equipment prior to the transmission of the first message. In some examples, the communication and processing circuitry 1641 and the transceiver 1610, shown and described in FIG. 16, may provide a means to transmit a first message that indicates that the user equipment is to report measurements of a first cell based on the measurement report configuration, the first cell being not activated as a secondary cell (SCell) for the user equipment prior to the transmission of the first message.

At block 1706, the network entity may receive a first measurement report responsive to the first message, the first measurement report being based on measurements by the user equipment of signals received from the first cell when the first cell was not activated as the SCell for the user equipment. In some examples, the activation processing circuitry 1643 together with the communication and processing circuitry 1641 and the transceiver 1610, shown and described in FIG. 16, may provide a means to receive a first measurement report responsive to the first message, the first measurement report being based on measurements by the user equipment of signals received from the first cell when the first cell was not activated as the SCell for the user equipment. In some examples, the communication and processing circuitry 1641 and the transceiver 1610, shown and described in FIG. 16, may provide a means to receive a first measurement report responsive to the first message, the first measurement report being based on measurements by the user equipment of signals received from the first cell when the first cell was not activated as the SCell for the user equipment.

In some examples, the first cell communicates via frequency range 2 (FR2) signaling.

In some examples, the network entity may transmit a transmission configuration indication (TCI) activation command after receiving (receipt of) the first measurement report. In some examples, the TCI activation command may indicate a synchronization signal block (SSB) identifier associated with the first cell. In some examples, the TCI activation command may further indicate a channel state information-reference signal (CSI-RS) transmitted by the first cell. In some examples, the network entity may receive a second measurement report that includes channel quality information (CQI) based on measurements by the user equipment of the CSI-RS transmitted by the first cell.

In some examples, the first measurement report may include a 7-bit reference signal received power (RSRP) parameter. In some examples, the RSRP parameter may include a value of 0 or 127 to indicate that the first measurement report does not include a valid measurement value. In some examples, the measurement report configuration may include an RSRP report configuration.

In some examples, the measurement report configuration specifies aperiodic reporting. In some examples, the measurement report configuration specifies periodic reporting.

In some examples, transmitting the measurement report configuration may include transmitting a radio resource control (RRC) message that includes the measurement report configuration. In some examples, the first message may include a medium access control-control element (MAC-CE). In some examples, the MAC-CE indicates that the first cell is being activated as the SCell for the user equipment. In some examples, the network entity may transmit another MAC-CE that indicates that the first cell is being activated as the SCell for the user equipment.

In some examples, the measurement report configuration specifies aperiodic reporting. In some examples, the first message specifies a time offset that the user equipment is to use when transmitting an aperiodic measurement report.

In some examples, the first measurement report may include a parameter that indicates that the first measurement report does not include a valid measurement value. In some examples, the measurement report configuration specifies periodic reporting.

In some examples, the network entity may periodically receive second measurement reports from the user equipment, the second measurement reports being based on a measurement of synchronization signal block (SSB) signals transmitted by the first cell.

In some examples, the first measurement report may include a parameter that indicates that the first measurement report does not include a valid measurement value. In some examples, the measurement report configuration specifies aperiodic reporting. In some examples, the network entity may receive a second measurement report from the user equipment, the second measurement report being based on a measurement of a synchronization signal block (SSB) signal transmitted by the first cell.

In some examples, the network entity may receive a second message that may include an indication of a quantity of reference signals that the user equipment is configured to measure. In some examples, the reference signals may include synchronization signal blocks (SSBs) or timing reference signals (TRSs).

In some examples, the first measurement report may include a valid measurement value. In some examples, the network entity may transmit a transmission configuration indication (TCI) activation command after receiving the first measurement report, the TCI activation command indicating a synchronization signal block (SSB) identifier associated with the first cell. In some examples, the network entity may receive a second measurement report from the user equipment, the second measurement report being based on a measurement of synchronization signal blocks (SSBs) transmitted by the first cell.

In some examples, the first measurement report may include a valid measurement value. In some examples, the network entity may transmit a transmission configuration indication (TCI) activation command after receiving the first measurement report, the TCI activation command indicating a synchronization signal block (SSB) identifier associated with the first cell. In some examples, the network entity may transmit downlink control information (DCI) indicating at least one timing reference signal (TRS) transmitted by the first cell. In some examples, the network entity may receive a second measurement report from the user equipment after the transmitting the DCI, the second measurement report being based on a measurement of at least one channel state information-reference signal (CSI-RS) transmitted by the first cell.

In some examples, the network entity may receive a second message that may include an indication of a quantity of timing reference signals (TRSs) that the user equipment is configured to measure. In some examples, the at least one TRS indicated by the DCI corresponds to the quantity of TRSs that the user equipment is configured to measure.

Referring again to FIG. 16, in one configuration, the network entity 1600 includes means for transmitting a measurement report configuration to a user equipment, means for transmitting a first message that indicates that the user equipment is to report measurements of a first cell based on the measurement report configuration, the first cell being not activated as a secondary cell (SCell) for the user equipment prior to the transmitting the first message, and means for receiving a first measurement report responsive to the first message, the first measurement report being based on measurements by the user equipment of signals received from the first cell when the first cell was not activated as the SCell for the user equipment. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 3, 6, and 16, and utilizing, for example, the methods and/or algorithms described herein in relation to FIG. 17.

The methods shown in FIGS. 15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving a measurement report configuration; measuring signals received from a first cell when the first cell is not activated as a secondary cell (SCell) for the user equipment; receiving a first message that indicates that the user equipment is to report measurements of the first cell based on the measurement report configuration; and transmitting a first measurement report responsive to the first message, the first measurement report being based on the measuring the signals received from the first cell when the first cell was not activated as the SCell for the user equipment.

Aspect 2: The method of aspect 1, wherein the first cell communicates via frequency range 2 (FR2) signaling.

Aspect 3: The method of any of aspects 1 through 2, further comprising: receiving a transmission configuration indication (TCI) activation command after transmitting the first measurement report, the TCI activation command indicating quasi-co-location information for a channel state information-reference signal (CSI-RS) transmitted by the first cell; and transmitting a second measurement report based on a measurement of the CSI-RS transmitted by the first cell.

Aspect 4: The method of any of aspects 1 through 3, wherein the first measurement report comprises a 7-bit reference signal received power (RSRP) parameter. Aspect 5: The method of aspect 4, further comprising: setting the RSRP parameter to a value of 0 or 127 to indicate that the first measurement report does not include a valid measurement value.

Aspect 6: The method of any of aspects 4 through 5, wherein the measurement report configuration comprises an RSRP report configuration.

Aspect 7: The method of any of aspects 1 through 6, wherein the measurement report configuration specifies aperiodic reporting.

Aspect 8: The method of any of aspects 1 through 6, wherein the measurement report configuration specifies periodic reporting.

Aspect 9: The method of any of aspects 1 through 8, wherein: the receiving the measurement report configuration comprises receiving a radio resource control (RRC) message that includes the measurement report configuration; and the first message comprises a medium access control-control element (MAC-CE).

Aspect 10: The method of aspect 9, wherein the MAC-CE indicates that the first cell is being activated as the SCell for the user equipment.

Aspect 11: The method of aspect 9, further comprising: receiving another MAC-CE that indicates that the first cell is being activated as the SCell for the user equipment.

Aspect 12: The method of any of aspects 1 through 7 and 9 through 11, wherein: the measurement report configuration specifies aperiodic reporting; and the first message specifies a time offset that the user equipment is to use when transmitting an aperiodic measurement report.

Aspect 13: The method of any of aspects 1 through 6 and 8 through 12, wherein: the first measurement report comprises a parameter that indicates that the first measurement report does not include a valid measurement value; the measurement report configuration specifies periodic reporting; and the method further comprises periodically measuring synchronization signal block (SSB) signals transmitted by the first cell and periodically transmitting second measurement reports based on the measuring the SSB signals.

Aspect 14: The method of any of aspects 1 through 7, 9 through 11, and 12, wherein: the first measurement report comprises a parameter that indicates that the first measurement report does not include a valid measurement value; the measurement report configuration specifies aperiodic reporting; and the method further comprises measuring a synchronization signal block (SSB) signal transmitted by the first cell and transmitting a second measurement report based on the measuring the SSB signal.

Aspect 15: The method of any of aspects 1 through 14, wherein the first measurement report comprises a valid measurement value, the method further comprising: receiving a transmission configuration indication (TCI) activation command after transmitting the first measurement report, the TCI activation command indicating a synchronization signal block (SSB) identifier associated with the first cell; and performing at least one of time tracking or frequency tracking based on an SSB transmission by the first cell, the SSB transmission being associated with the SSB identifier.

Aspect 16: The method of any of aspects 1 through 15, further comprising: transmitting a second message that comprises an indication of a quantity of reference signals that the user equipment is configured to measure.

Aspect 17: The method of aspect 16, wherein the reference signals comprise synchronization signal blocks (SSBs) or timing reference signals (TRSs).

Aspect 18: The method of any of aspects 1 through 12 and 15 through 17, wherein the first measurement report comprises a valid measurement value, the method further comprising: receiving a transmission configuration indication (TCI) activation command after transmitting the first measurement report, the TCI activation command indicating a synchronization signal block (SSB) identifier associated with the first cell; measuring synchronization signal blocks (SSBs) transmitted by the first cell; and transmitting a second measurement report based on the measuring the SSBs transmitted by the first cell.

Aspect 19: The method of any of aspects 1 through 18, further comprising: receiving downlink control information after transmitting the first measurement report, the downlink control information indicating at least one aperiodic tracking reference signal (A-TRS) transmission by the first cell; and performing at least one of time tracking or frequency tracking based on the at least one A-TRS transmission by the first cell.

Aspect 20: The method of aspect 19, further comprising: transmitting a second message that comprises an indication of a quantity of timing reference signals (TRSs) that the user equipment is configured to measure, wherein the at least one A-TRS transmission indicated by the downlink control information corresponds to the quantity of TRSs that the user equipment is configured to measure.

Aspect 21: A method for wireless communication at a network entity, the method comprising: transmitting a measurement report configuration to a user equipment; transmitting a first message that indicates that the user equipment is to report measurements of a first cell based on the measurement report configuration, the first cell being not activated as a secondary cell (SCell) for the user equipment prior to the transmitting the first message; and receiving a first measurement report responsive to the first message, the first measurement report being based on measurements by the user equipment of signals received from the first cell when the first cell was not activated as the SCell for the user equipment.

Aspect 22: The method of aspect 21, wherein the first cell communicates via frequency range 2 (FR2) signaling.

Aspect 23: The method of any of aspects 21 through 22, further comprising: transmitting a transmission configuration indication (TCI) activation command after receiving the first measurement report, the TCI activation command indicating a synchronization signal block (SSB) identifier associated with the first cell, and the TCI activation command further indicating a channel state information-reference signal (CSI-RS) transmitted by the first cell.

Aspect 24: The method of aspect 23, further comprising: receiving a second measurement report that includes channel quality information (CQI) based on measurements by the user equipment of the CSI-RS transmitted by the first cell.

Aspect 25: The method of any of aspects 21 through 24, wherein the first measurement report comprises a 7-bit reference signal received power (RSRP) parameter.

Aspect 26: The method of aspect 25, wherein the RSRP parameter comprises a value of 0 or 127 to indicate that the first measurement report does not include a valid measurement value.

Aspect 27: The method of any of aspects 21 through 26, wherein the measurement report configuration comprises an RSRP report configuration.

Aspect 28: The method of any of aspects 21 through 27, wherein the measurement report configuration specifies aperiodic reporting.

Aspect 29: The method of any of aspects 21 through 27, wherein the measurement report configuration specifies periodic reporting.

Aspect 30: The method of any of aspects 21 through 29, wherein: the transmitting the measurement report configuration comprises transmitting a radio resource control (RRC) message that includes the measurement report configuration; and the first message comprises a medium access control-control element (MAC-CE).

Aspect 31: The method of aspect 30, wherein the MAC-CE indicates that the first cell is being activated as the SCell for the user equipment.

Aspect 32: The method of aspect 30, further comprising: transmitting another MAC-CE that indicates that the first cell is being activated as the SCell for the user equipment.

Aspect 33: The method of any of aspects 21 through 28 and 30 through 32, wherein: the measurement report configuration specifies aperiodic reporting; and the first message specifies a time offset that the user equipment is to use when transmitting an aperiodic measurement report.

Aspect 34: The method of any of aspects 21 through 27 and 29 through 32, wherein: the first measurement report comprises a parameter that indicates that the first measurement report does not include a valid measurement value; the measurement report configuration specifies periodic reporting; and the method further comprises periodically receiving second measurement reports from the user equipment, the second measurement reports being based on a measurement of synchronization signal block (SSB) signals transmitted by the first cell.

Aspect 35: The method of any of aspects 21 through 28 and 30 through 32, wherein: the first measurement report comprises a parameter that indicates that the first measurement report does not include a valid measurement value; the measurement report configuration specifies aperiodic reporting; and the method further comprises receiving a second measurement report from the user equipment, the second measurement report being based on a measurement of a synchronization signal block (SSB) signal transmitted by the first cell.

Aspect 36: The method of any of aspects 21 through 35, further comprising: receiving a second message that comprises an indication of a quantity of reference signals that the user equipment is configured to measure.

Aspect 37: The method of aspect 36, wherein the reference signals comprise synchronization signal blocks (SSBs) or timing reference signals (TRSs).

Aspect 38: The method of any of aspects 21 through 37, wherein the first measurement report comprises a valid measurement value, the method further comprising: transmitting a transmission configuration indication (TCI) activation command after receiving the first measurement report, the TCI activation command indicating a synchronization signal block (SSB) identifier associated with the first cell; and receiving a second measurement report from the user equipment, the second measurement report being based on a measurement of synchronization signal blocks (SSBs) transmitted by the first cell.

Aspect 39: The method of any of aspects 21 through 37, wherein the first measurement report comprises a valid measurement value, the method further comprising: transmitting a transmission configuration indication (TCI) activation command after receiving the first measurement report, the TCI activation command indicating a synchronization signal block (SSB) identifier associated with the first cell; transmitting downlink control information (DCI) indicating at least one timing reference signal (TRS) transmitted by the first cell; and receiving a second measurement report from the user equipment after the transmitting the DCI, the second measurement report being based on a measurement of at least one channel state information-reference signal (CSI-RS) transmitted by the first cell.

Aspect 40: The method of aspect 39, further comprising: receiving a second message that comprises an indication of a quantity of timing reference signals (TRSs) that the user equipment is configured to measure, wherein the at least one TRS indicated by the DCI corresponds to the quantity of TRSs that the user equipment is configured to measure.

Aspect 41: A user equipment comprising: a transceiver configured to communicate with a radio access network, a memory, and at least one processor coupled to the transceiver and the memory, wherein the at least one processor is individually or collectively configured to perform any one or more of aspects 1 through 20.

Aspect 42: An apparatus configured for wireless communication comprising at least one means for performing any one or more of aspects 1 through 20.

Aspect 43: A non-transitory computer-readable medium storing computer-executable code, comprising code for causing an apparatus to perform any one or more of aspects 1 through 20.

Aspect 44: A network entity comprising: a transceiver, a memory, and at least one processor coupled to the transceiver and the memory, wherein the at least one processor is individually or collectively configured to perform any one or more of aspects 21 through 40.

Aspect 45: An apparatus configured for wireless communication comprising at least one means for performing any one or more of aspects 21 through 40.

Aspect 46: A non-transitory computer-readable medium storing computer-executable code, comprising code for causing an apparatus to perform any one or more of aspects 21 through 40.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 6, 14, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver; and
at least one processor coupled to the transceiver, wherein the at least one processor is individually or collectively configured to:
receive a measurement report configuration;
measure signals received from a first cell when the first cell is not activated as a secondary cell (SCell) for the user equipment;
receive a first message that indicates that the user equipment is to report measurements of the first cell based on the measurement report configuration; and
transmit a first measurement report responsive to the first message, the first measurement report being based on the measurement of the signals received from the first cell when the first cell was not activated as the SCell for the user equipment.

2. The user equipment of claim 1, wherein the first cell communicates via frequency range 2 (FR2) signaling.

3. The user equipment of claim 1, wherein the at least one processor is further individually or collectively configured to:
receive a transmission configuration indication (TCI) activation command after the transmission of the first measurement report, the TCI activation command indicating quasi-co-location information for a channel state information-reference signal (CSI-RS) transmitted by the first cell; and
transmit a second measurement report based on a measurement of the CSI-RS transmitted by the first cell.

4. The user equipment of claim 1, wherein the first measurement report comprises a 7-bit reference signal received power (RSRP) parameter.

5. The user equipment of claim 4, wherein the at least one processor is further individually or collectively configured to:
set the RSRP parameter to a value of 0 or 127 to indicate that the first measurement report does not include a valid measurement value.

6. The user equipment of claim 4, wherein the measurement report configuration comprises an RSRP report configuration.

7. The user equipment of claim 1, wherein the measurement report configuration specifies aperiodic reporting.

8. The user equipment of claim 1, wherein the measurement report configuration specifies periodic reporting.

9. The user equipment of claim 1, wherein:
the at least one processor is further individually or collectively configured to receive a radio resource control (RRC) message that includes the measurement report configuration; and
the first message comprises a medium access control-control element (MAC-CE).

10. The user equipment of claim 9, wherein the MAC-CE indicates that the first cell is being activated as the SCell for the user equipment.

11. The user equipment of claim 9, wherein the at least one processor is further individually or collectively configured to:
receive another MAC-CE that indicates that the first cell is being activated as the SCell for the user equipment.

12. The user equipment of claim 1, wherein:
the measurement report configuration specifies aperiodic reporting; and
the first message specifies a time offset that the user equipment is to use when transmitting an aperiodic measurement report.

13. The user equipment of claim 1, wherein:
the first measurement report comprises a parameter that indicates that the first measurement report does not include a valid measurement value;
the measurement report configuration specifies periodic reporting; and
the at least one processor is further individually or collectively configured to periodically measure synchronization signal block (SSB) signals transmitted by the first cell and periodically transmit second measurement reports based on the periodic measurement of the SSB signals.

14. The user equipment of claim 1, wherein:
the first measurement report comprises a parameter that indicates that the first measurement report does not include a valid measurement value;
the measurement report configuration specifies aperiodic reporting; and
the at least one processor is further individually or collectively configured to measure a synchronization signal block (SSB) signal transmitted by the first cell and transmit a second measurement report based on the measurement of the SSB signal.

15. The user equipment of claim 1, wherein the first measurement report comprises a valid measurement value, and the at least one processor is further individually or collectively configured to:
receive a transmission configuration indication (TCI) activation command after the transmission of the first measurement report, the TCI activation command indicating a synchronization signal block (SSB) identifier associated with the first cell; and
perform at least one of time tracking or frequency tracking based on an SSB transmission by the first cell, the SSB transmission being associated with the SSB identifier.

16. The user equipment of claim 1, wherein the at least one processor is further individually or collectively configured to:
  transmit a second message that comprises an indication of a quantity of reference signals that the user equipment is configured to measure.

17. The user equipment of claim 16, wherein the reference signals comprise synchronization signal blocks (SSBs) or timing reference signals (TRSs).

18. The user equipment of claim 1, wherein the first measurement report comprises a valid measurement value, and the at least one processor is further individually or collectively configured to:
  receive a transmission configuration indication (TCI) activation command after the transmission of the first measurement report, the TCI activation command indicating a synchronization signal block (SSB) identifier associated with the first cell;
  measure synchronization signal blocks (SSBs) transmitted by the first cell; and
  transmit a second measurement report based on the measurement of the SSBs transmitted by the first cell.

19. The user equipment of claim 1, wherein the at least one processor is further individually or collectively configured to:
  receive downlink control information after the transmission of the first measurement report, the downlink control information indicating at least one aperiodic tracking reference signal (A-TRS) transmission by the first cell; and
  perform at least one of time tracking or frequency tracking based on the at least one A-TRS transmission by the first cell.

20. The user equipment of claim 19, wherein:
  the at least one processor is further individually or collectively configured to transmit a second message that comprises an indication of a quantity of timing reference signals (TRSs) that the user equipment is configured to measure; and
  the at least one A-TRS transmission indicated by the downlink control information corresponds to the quantity of TRSs that the user equipment is configured to measure.

21. A method for wireless communication at a user equipment, the method comprising:
  receiving a measurement report configuration;
  measuring signals received from a first cell when the first cell is not activated as a secondary cell (SCell) for the user equipment;
  receiving a first message that indicates that the user equipment is to report measurements of the first cell based on the measurement report configuration; and
  transmitting a first measurement report responsive to the first message, the first measurement report being based on the measuring the signals received from the first cell when the first cell was not activated as the SCell for the user equipment.

22. A network entity, comprising:
  a transceiver; and
  at least one processor coupled to the transceiver, wherein the at least one processor is individually or collectively configured to:
    transmit a measurement report configuration to a user equipment;
    transmit a first message that indicates that the user equipment is to report measurements of a first cell based on the measurement report configuration, the first cell being not activated as a secondary cell (SCell) for the user equipment prior to the transmitting the first message; and
    receive a first measurement report responsive to the first message, the first measurement report being based on measurements by the user equipment of signals received from the first cell when the first cell was not activated as the SCell for the user equipment.

23. The network entity of claim 22, wherein the at least one processor is further individually or collectively configured to:
  transmit a transmission configuration indication (TCI) activation command after the receipt of the first measurement report, the TCI activation command indicating a synchronization signal block (SSB) identifier associated with the first cell, and the TCI activation command further indicating a channel state information-reference signal (CSI-RS) transmitted by the first cell.

24. The network entity of claim 23, wherein the at least one processor is further individually or collectively configured to:
  receive a second measurement report that includes channel quality information (CQI) based on measurements by the user equipment of the CSI-RS transmitted by the first cell.

25. The network entity of claim 22, wherein:
  the measurement report configuration specifies aperiodic reporting; and
  the first message specifies a time offset that the user equipment is to use when transmitting an aperiodic measurement report.

26. The network entity of claim 22, wherein:
  the first measurement report comprises a parameter that indicates that the first measurement report does not include a valid measurement value;
  the measurement report configuration specifies periodic reporting; and
  the at least one processor is further individually or collectively configured to periodically receive second measurement reports from the user equipment, the second measurement reports being based on a measurement of synchronization signal block (SSB) signals transmitted by the first cell.

27. The network entity of claim 22, wherein:
  the first measurement report comprises a parameter that indicates that the first measurement report does not include a valid measurement value;
  the measurement report configuration specifies aperiodic reporting; and
  the at least one processor is further individually or collectively configured to receive a second measurement report from the user equipment, the second measurement report being based on a measurement of a synchronization signal block (SSB) signal transmitted by the first cell.

28. The network entity of claim 22, wherein the first measurement report comprises a valid measurement value, and the at least one processor is further individually or collectively configured to:
  transmit a transmission configuration indication (TCI) activation command after the receipt of the first measurement report, the TCI activation command indicating a synchronization signal block (SSB) identifier associated with the first cell; and receive a second measurement report from the user equipment, the second measurement report being based on a measurement of synchronization signal blocks (SSBs) transmitted by the first cell.

29. The network entity of claim 22, wherein the first measurement report comprises a valid measurement value, and the at least one processor is further individually or collectively configured to:
  transmit a transmission configuration indication (TCI) activation command after the receipt of the first measurement report, the TCI activation command indicating a synchronization signal block (SSB) identifier associated with the first cell;
  transmit downlink control information (DCI) indicating at least one timing reference signal (TRS) transmitted by the first cell; and
  receive a second measurement report from the user equipment after the transmission of the DCI, the second measurement report being based on a measurement of at least one channel state information-reference signal (CSI-RS) transmitted by the first cell.

30. A method for wireless communication at a network entity, the method comprising:
  transmitting a measurement report configuration to a user equipment;
  transmitting a first message that indicates that the user equipment is to report measurements of a first cell based on the measurement report configuration, the first cell being not activated as a secondary cell (SCell) for the user equipment prior to the transmitting the first message; and
  receiving a first measurement report responsive to the first message, the first measurement report being based on measurements by the user equipment of signals received from the first cell when the first cell was not activated as the SCell for the user equipment.

* * * * *